United States Patent [19]
Levecque et al.

[11] 3,874,886
[45] Apr. 1, 1975

[54] FIBER TORATION; METHOD, EQUIPMENT AND PRODUCT

[75] Inventors: Marcel Levecque, Saint-Gratien; Jean A. Battigelli, Rantigny, both of France

[73] Assignee: Saint-Gobain Industries, Neuilly-sur-Seine, France

[22] Filed: Apr. 24, 1973

[21] Appl. No.: 353,983

[30] Foreign Application Priority Data
Mar. 30, 1973  France .............................. 73.11525

[52] U.S. Cl. .................. 106/50, 65/5, 65/16, 264/5, 264/12, 264/176, 425/7
[51] Int. Cl. ............................................. C03b 37/04
[58] Field of Search ................... 65/5-8, 14-16; 264/176 F, 5, 12; 425/7; 161/172; 106/50

[56] References Cited
UNITED STATES PATENTS

| | | | |
|---|---|---|---|
| 2,515,738 | 7/1950 | Slayter et al. ............................ | 65/16 |
| 2,609,566 | 9/1952 | Slayter et al. ............................ | 65/6 |
| 2,687,551 | 8/1954 | Stalego .................................... | 65/7 |
| 2,972,169 | 2/1961 | Stalego .................................... | 65/6 |
| 2,982,991 | 5/1961 | Karlovitz ................................. | 65/16 X |
| 3,357,808 | 12/1967 | Eberle..................................... | 65/7 |
| 3,634,055 | 1/1972 | Paymal .................................... | 65/6 |
| 3,649,232 | 5/1972 | Battigelli................................. | 65/6 |

OTHER PUBLICATIONS

Vogler – "Surface Pressure Distributions Induced on a Flat Plate by a Cold Air Set Issuing Perpendicularly from the Plate and Normal to Low–Stream Flow," NASA Technical Note D–1629, March, 1963.

*Primary Examiner*—Robert L. Lindsay, Jr.
*Attorney, Agent, or Firm*—Synnestvedt & Lechner

[57] ABSTRACT

Method and apparatus for the production of fibrous materials from attenuable substances, particularly molten glass, are disclosed, along with the fiber products which result. In the disclosed system the material to be fiberized flows into a region established as a result of the interaction of a jet transversely oriented with respect to a larger blast, the material being acted upon in the interaction zone to produce a highly attenuated fiber.

68 Claims, 37 Drawing Figures

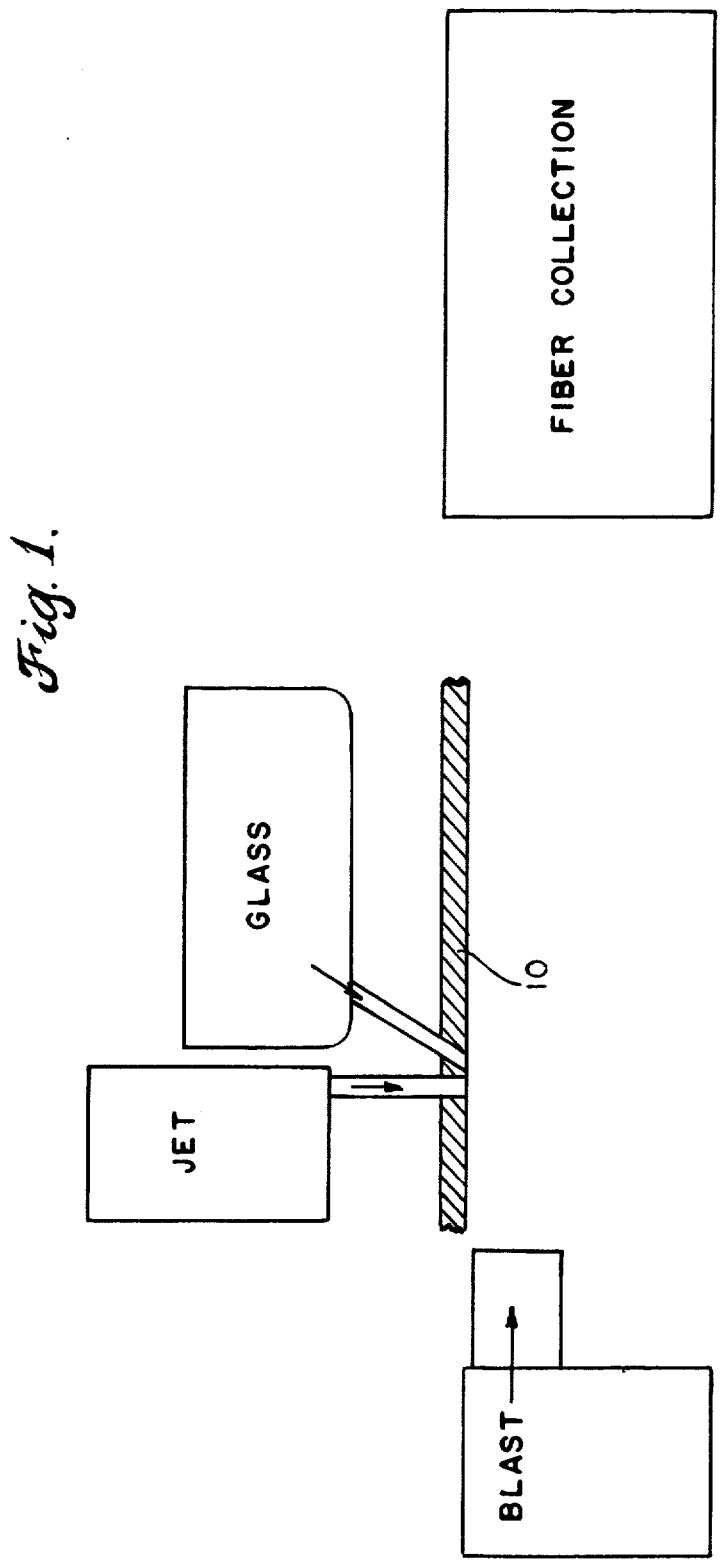

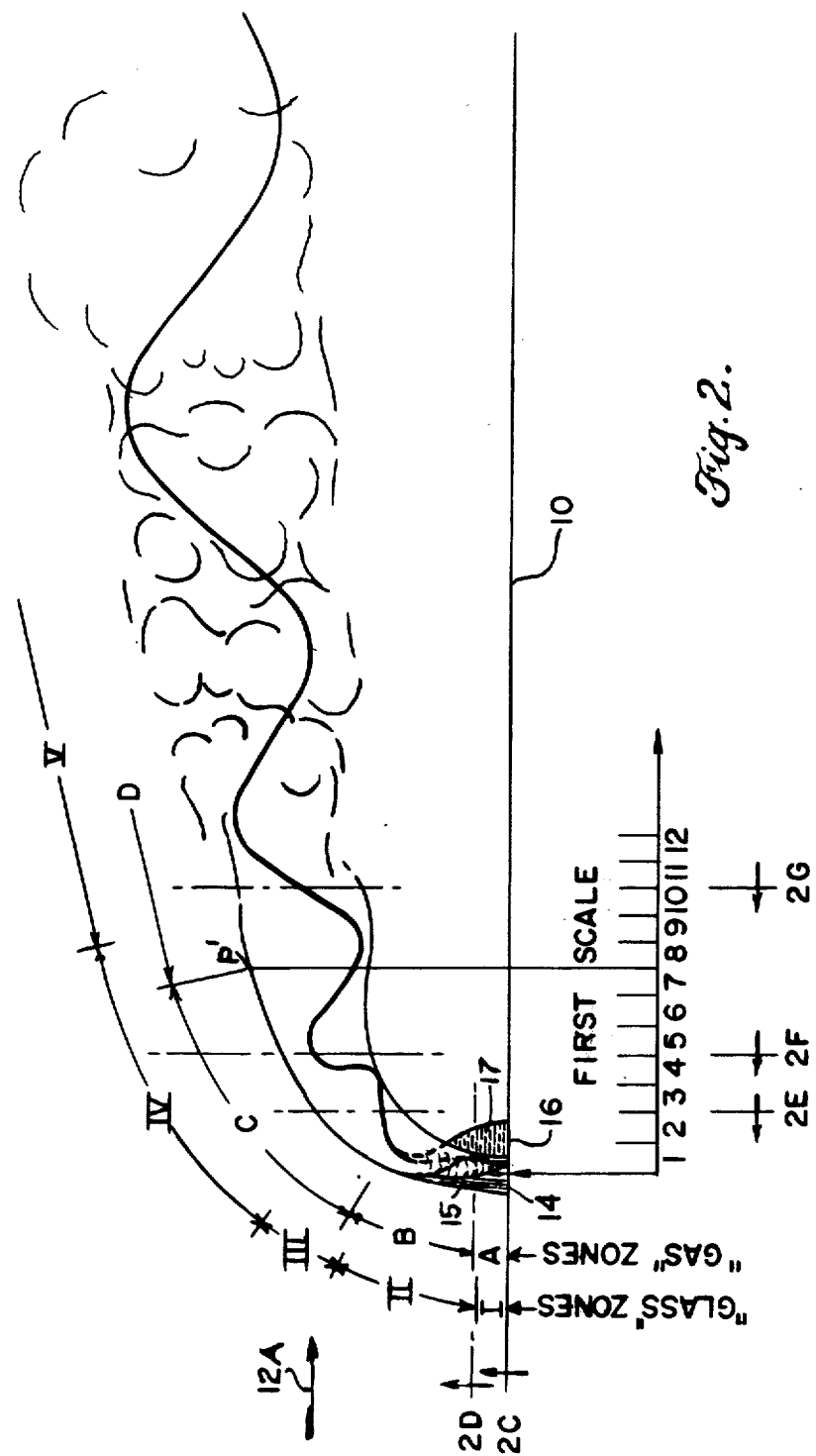

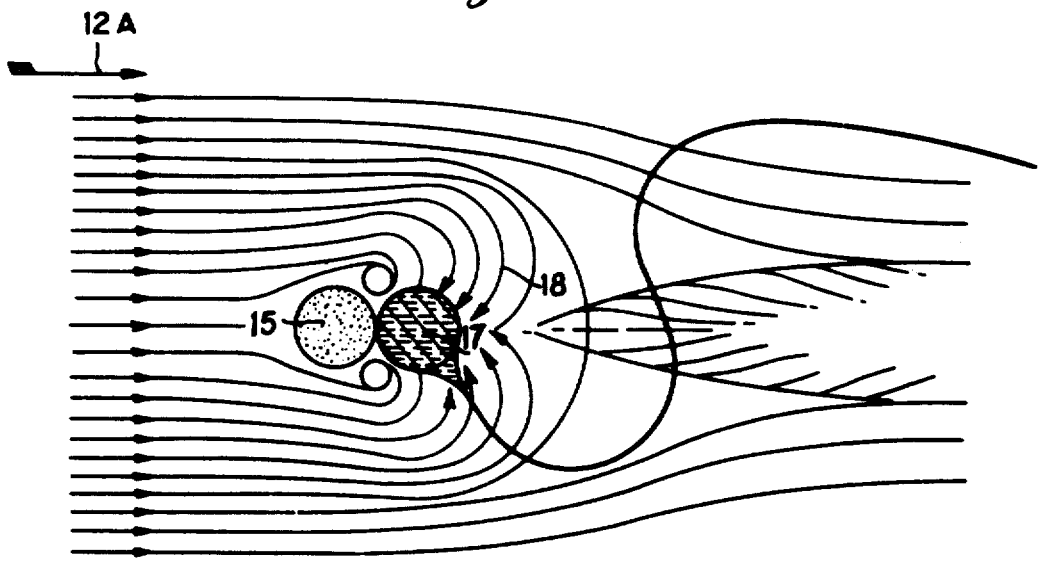

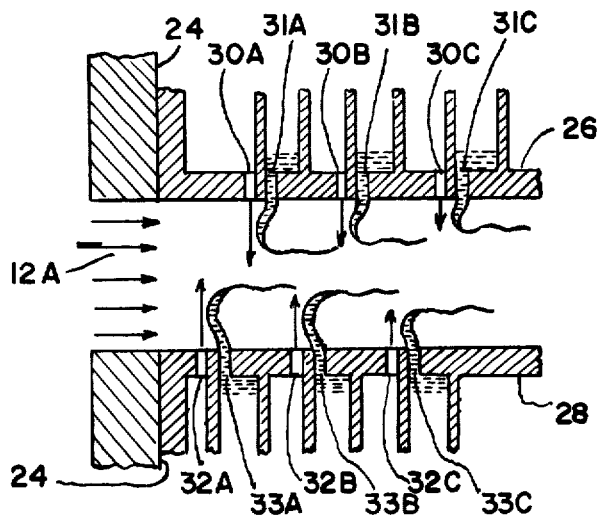
Fig. 3.
Fig. 3A.
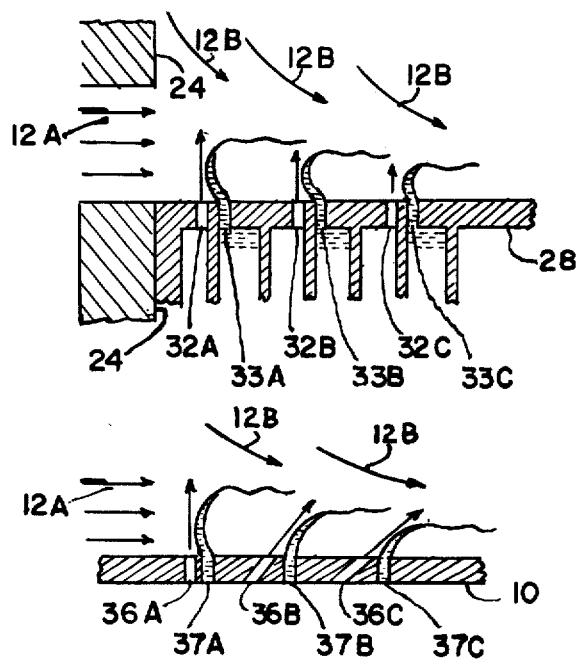
Fig. 4.
Fig. 5.

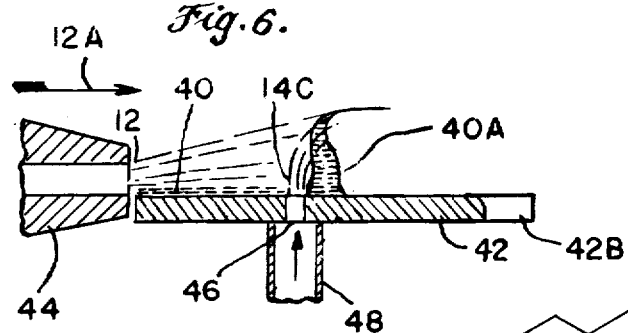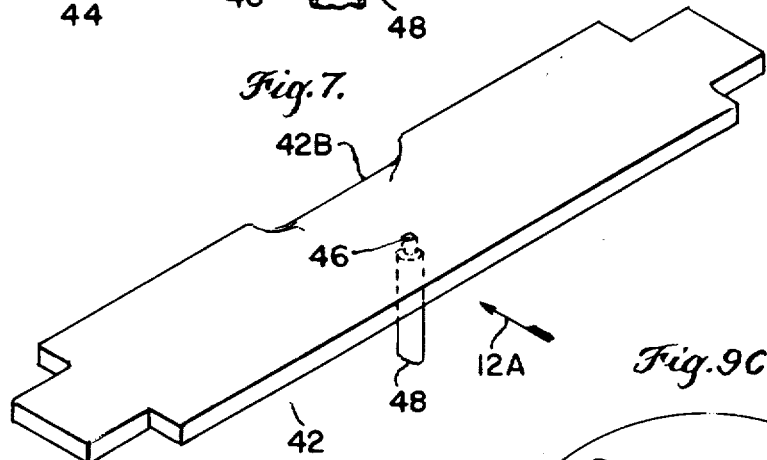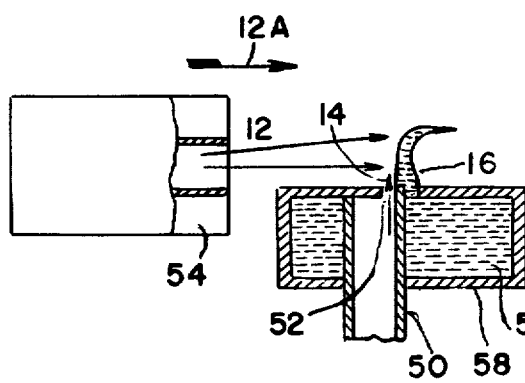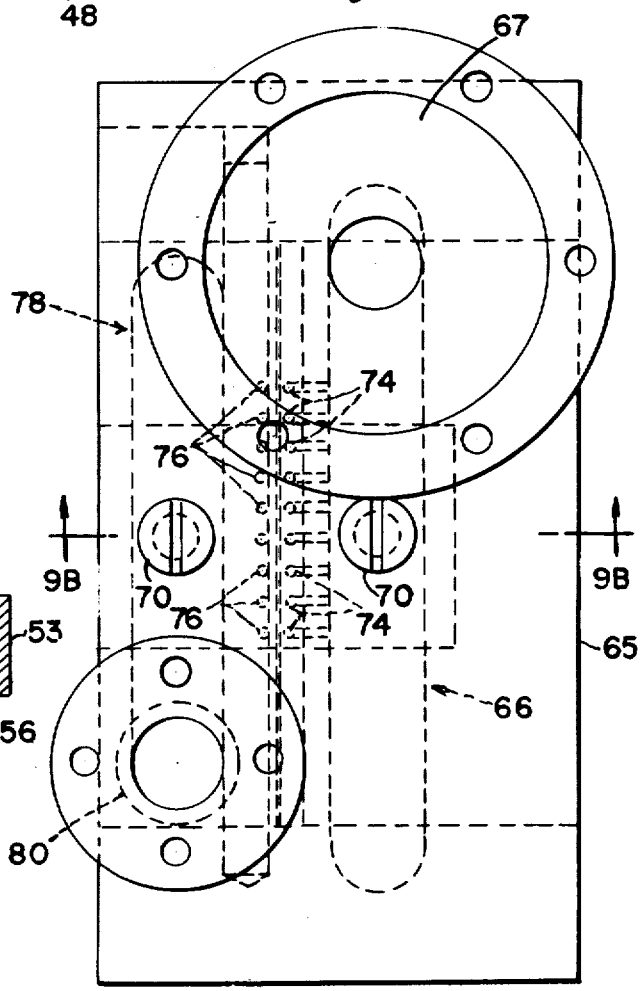

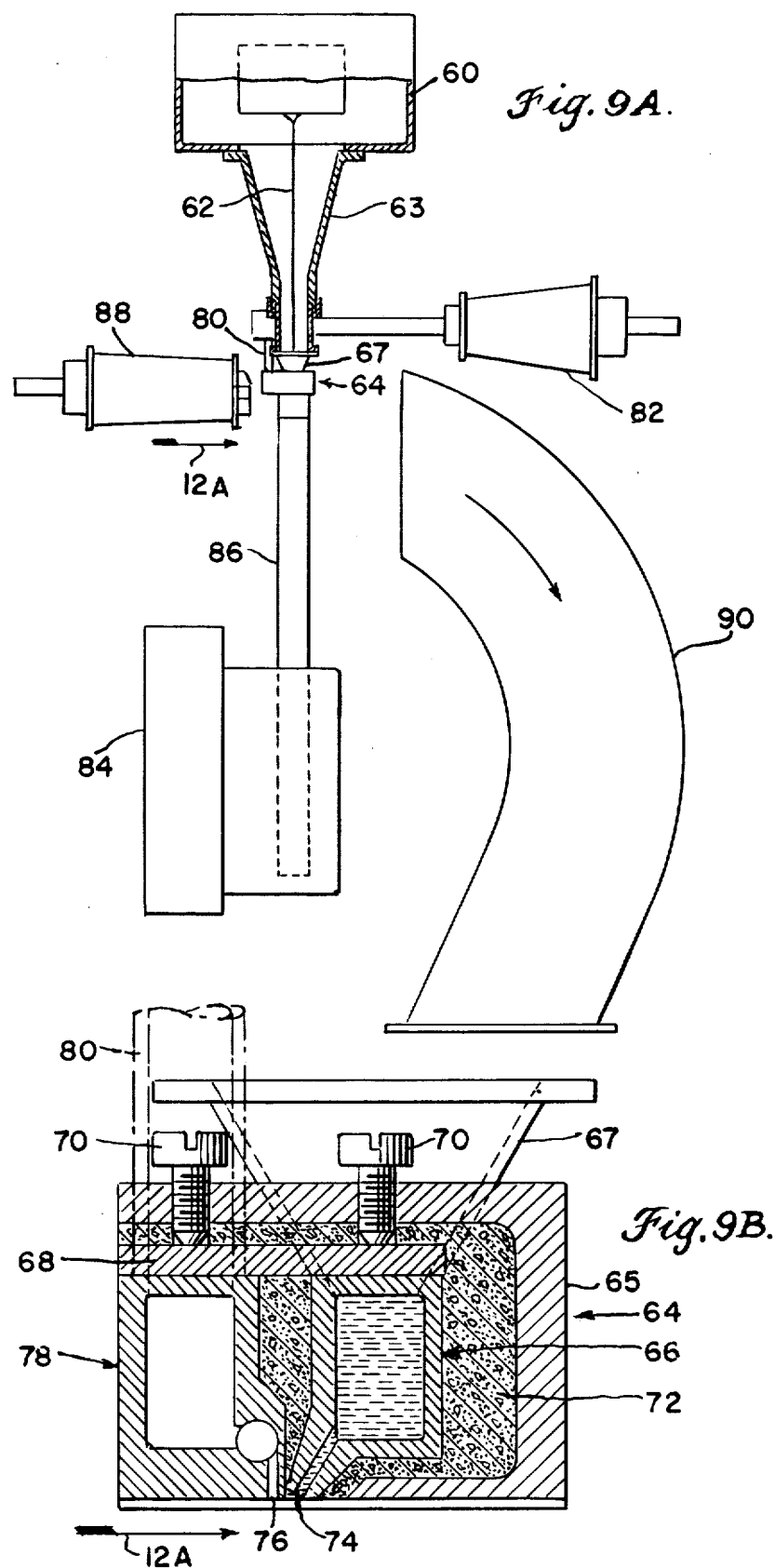

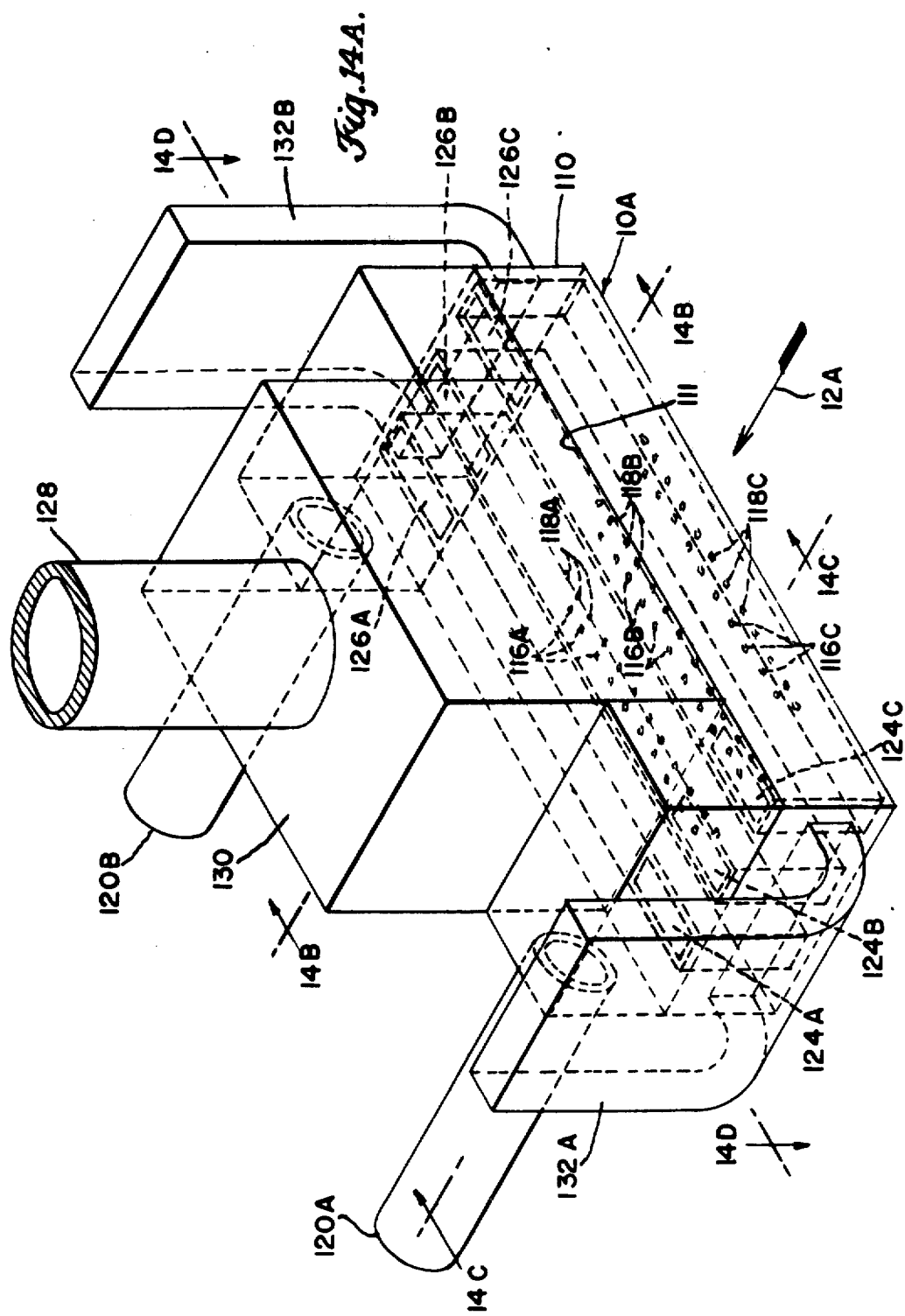

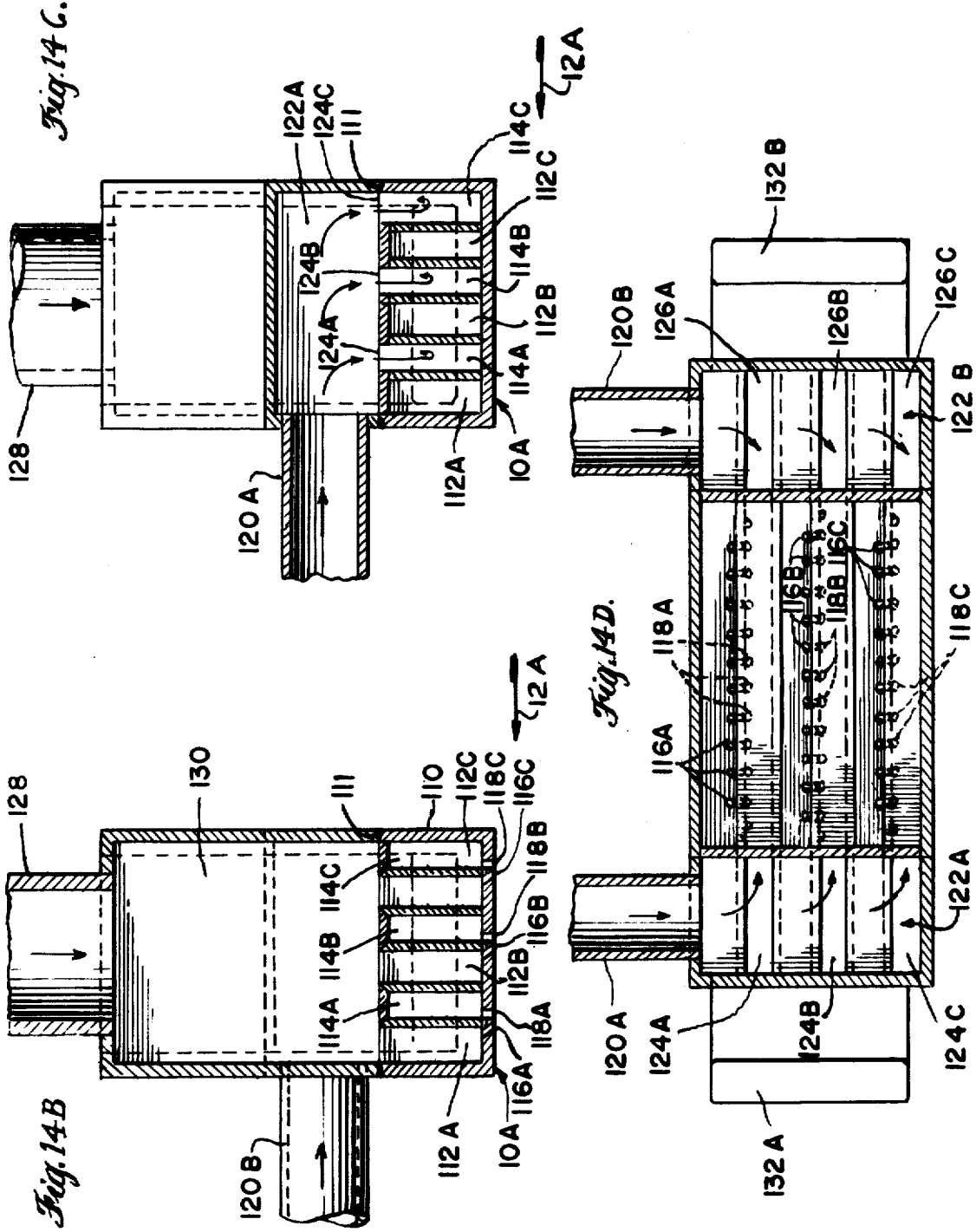

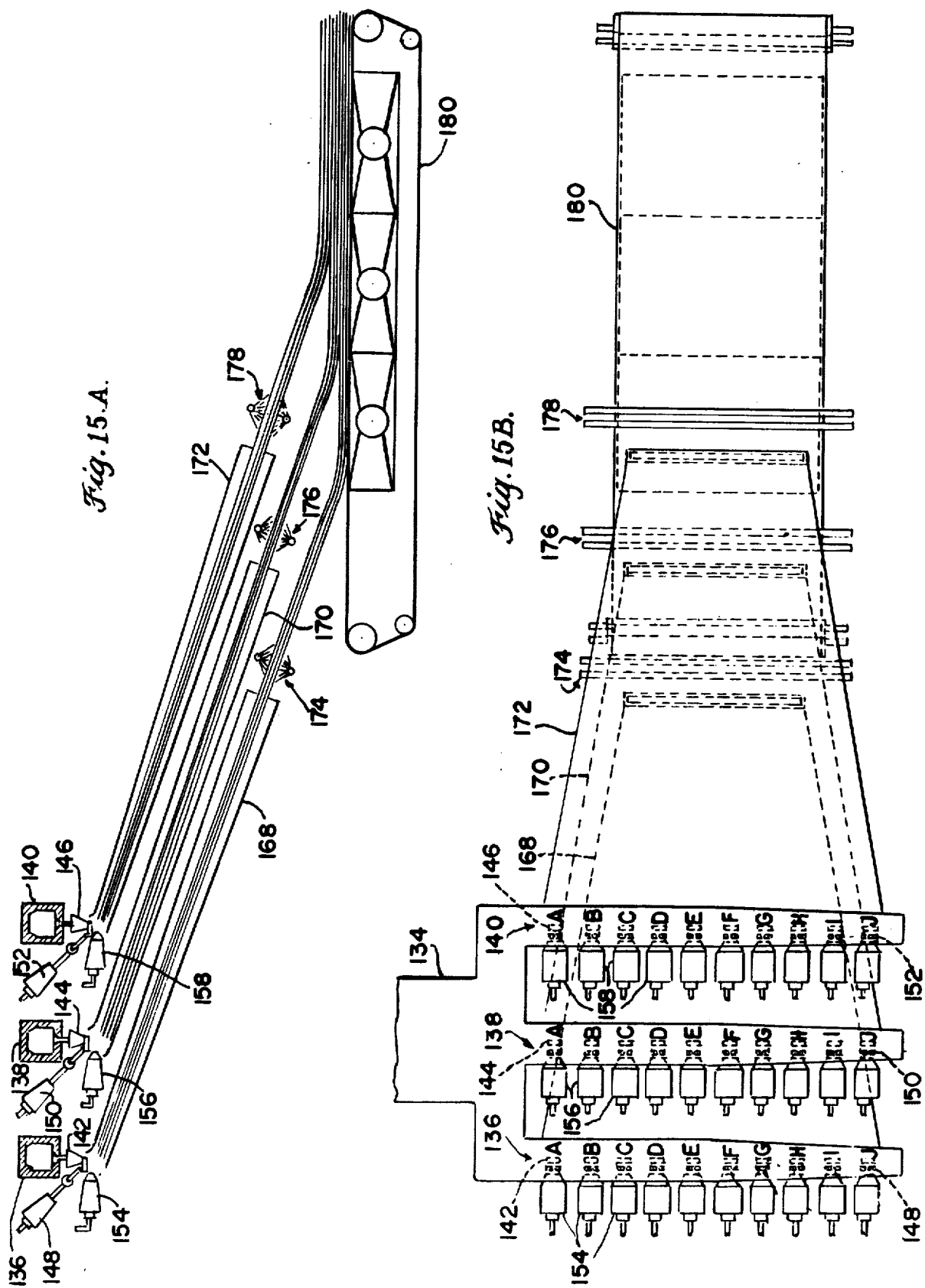

FIBER TORATION; METHOD, EQUIPMENT AND PRODUCT

TABLE OF CONTENTS

In connection with the following listing of the headings and in connection with the text of the specification between the headings as inserted in the specification, it is to be understood that not all of the text which intervenes between successive headings is necessarily directly related to the subject of the preceding heading, because in many instances interrelated subjects are jointly considered or are considered in overlapping sequences.

ABSTRACT
INTRODUCTION
BACKGROUND
STATEMENT OF THE PRIOR ART
  1. Longitudinal Blowing
  2. Strand
  3. Aerocor
  4. Centrifuging
ANALYSIS OF THE PRIOR ART
BIBLIOGRAPHY OF PRIOR PATENTS
OBJECTS AND ADVANTAGES
TABLE I
BRIEF DESCRIPTION OF DRAWINGS
BRIEF DESCRIPTION OF TORATION
FIGURE 1
FIGURES 1A-B-C
GENERAL STATEMENT OF VARIABLES
ANALYSIS OF TORATION - FIGURES 2 TO 2H
TABLE II - TORATION ZONES
ZONES OF JET INTERACTION ACTIVITY
  Zone A
  Zone B
  Zone C
VELOCITY AND ENERGY OF BLAST AND JET (PART A)
  Zone D
ZONES OF ACTION ON GLASS
  Zone I
  Zone II
  Zone III
  Zone IV
  Zone V
BIBLIOGRAPHY OF SCIENTIFIC ARTICLES
FIGURE 3A
INTRA-AXIAL SPACING RANGE
TRANSVERSE AND UPSTREAM-DOWNSTREAM INTER-AXIAL SPACING RANGE (PART A)
FIGURE 3
FIGURE 4
FIGURE 5
INTER-AXIAL SPACING RANGE (PART B) (WITH STAGGERED CENTERS)
FIGURES 6 AND 7
FIGURE 8
FIGURES 9A-B-C
FIGURES 12 AND 12A (PART A)
GLASS TEMPERATURES (PART A)
GLASS COMPOSITION (PART A)
GLASS ORIFICE SIZE
GLASS TEMPERATURES (PART B)
FIGURE 10
FIGURE 11
FIGURES 12 AND 12A (PART B)
FIGURES 13A-B
INTER-AXIAL SPACING RANGE (PART C) VELOCITY AND ENERGY OF BLAST AND JET (PART B)
ANGLE OF JET TO BLAST
INTER-AXIAL SPACING RANGE (PART D)
FIGURES 14A-D
FIGURES 15A-D
BLAST AND JET TEMPERATURES
BLAST AND JET VELOCITIES AND PRESSURES
FIBER SIZE AND CHARACTERISTICS
SPECIFIC EXAMPLES
GLASS COMPOSITION (PART B)
GLASS COMPOSITION (PART C)
CROSS REFERENCE

INTRODUCTION

The invention relates to fine fibers and to the production thereof from a substance in a condition in which it is capable of being attenuated, such substances being hereafter generally referred to as "attenuable materials", particularly attenuable materials which soften or liquefy upon entering a molten state as a result of the application of heat and which harden, or become relatively solid, upon cooling.

The process and equipment of the invention are especially suited to the formation of fibers from glass and the disclosure herein accordingly emphasizes glass fibers and their production.

Attention is directed to the companion application filed simultaneously herewith by the present applicants, together with another, which companion application is further referred to at the end of this specification under the heading CROSS REFERENCE.

BACKGROUND

There are four rather well-defined and recognized prior art techniques by which glass fibers can be made, these four techniques, which are mentioned at this point but discusssed in more detail herebelow, being:

1. Longitudinal Blowing: Other terms sometimes used include "blown fiber," "steam blown wool," "steam blown bonded mat, " "low pressure air blowing, " or "lengthwise jets."

2. Strand: Other terms sometimes used are "continuous filament," or "textile fibers."

3. Aerocor: Another term sometimes used is "flame attenuation."

4. Centrifuging: Other terms sometimes used include "rotary process," "centrifugal process," "tel process," or "supertel process."

There are numerous variants of each of the above four processes, and some efforts in the art to combine certain of the processes. Further, there are other techniques discussed in the prior art by which prior workers have attempted to make glass fibers. However, the variants, attempted combinations, and attempted other techniques have not met with sufficient success to achieve a separate and recognizable status in the art.

As will be clear from a study of this specification, the invention presents a new, fifth technique which is unique in principle and practice, and which brings about unique results, and therefore is the starting point of a new art.

For this reason, and also because a diligent search has failed to reveal any suitable existing English word which aptly applies to our invention, we have coined the word "torate," a verb, and the word "toration," a noun, to refer to our new technique and product. The usage of these new words in the present specification will illuminate their meanings, but for present purposes it is pointed out that, by our new technique, glass can be "torated" into fibers, the jet and blast which cooperate to effect fiberization can be referred to as the "toratating" current or blast, the fibers which result can be said to have been "torated," or to be "torated" fibers, and the process involved can be referred to as "toration."

STATEMENT OF THE PRIOR ART

Attention is now turned to a more detailed survey of the four prior art techniques briefly mentioned above. The numbers appearing within parentheses in the text below refer to prior art references fully identified in the bibliography set forth at the end of this section.

1. Longitudinal Blowing

Longitudinal blowing 1 2 3 4 is a glass fiber manufacturing process according to which melted glass flows from the forehearth of a furnace through orifices in one or two rows of tips protruding downwardly from a bushing, the glass being thereby formed into multiple glass streams which flow down into an attenuating zone where the streams pass between downwardly converging gaseous blasts. The blast emitting means are located in close proximity to the streams so that the converging blasts travel in a downward direction substantially parallel to the direction of travel of the glass streams. Generally the glass streams bisect the angle between the converging blasts. The blasts are typically high pressure steam.

There are two longitudinal blowing techniques. In the first technique the attenuating blasts engage already drawn fibers and the product resulting is typically a mat, commonly known as "steam blown bonded mat," suitable for reinforcement. In the second longitudinal blowing technique the attenuating blasts strike directly on larger streams of molten glass and the product resulting is typically an insulation wool commonly known as "steam blown wool."

In a variation 5 of the first longitudinal blowing technique, the entire bushing structure and associated furnace are enclosed within a pressure chamber so that, as the streams of glass emerge from the bushing, the streams are attenuated by pressurized air emerging from the pressure chamber through a slot positioned directly beneath the glass emitting tips of the bushing, this variation being commonly referred to as "low pressure air blowing," and products being commonly known as "low pressure air blown bonded mat and staple yarn."

2. Strand

The strand glass fiber manufacturing process 6 7 begins in the manner described above in connection with longitudinal blowing, that is, multiple glass streams are formed by flow through orifices in tips protruding downwardly from a bushing. However, the strand process does not make use of any blast for attenuation purposes but, on the contrary, uses mechanical pulling which is accomplished at high speed by means of a rotating drum onto which the fiber is wound or by means of rotating rollers between which the fiber passes. The prior art patents in the field of the strand process are far too numerous to mention and are of no real significance to the present invention. Therefore, it is considered sufficient that the references noted above are illustrative of the strand process.

3. Aerocor

In the aerocor process 8 9 for making glass fibers, the glass is fed into a high temperature and high velocity blast while in the form of a solid rod, rather than flowing in a liquid stream as in the longitudinal blowing and strand processes discussed above. The rod, or sometimes a coarse filament, of glass is fed from a side, usually substantially perpendicularly, into a hot gaseous blast. The end of the rod is heated and softened by the blast so that fiber can be attenuated therefrom by the force of the blast, the fiber being carried away entrained in the blast.

4. Centrifuging

In the centrifuging glass fiber manufacturing process 10 11, molten glass is fed into the interior of a rapidly rotating centrifuge which has a plurality of orifices in the periphery. The glass flows through the orifices in the form of streams under the action of centrifugal force and the glass streams then come under the influence of a concentric and generally downwardly directed hot blast of flames or hot gas, and may also, at a location concentric with the first blast and farther outboard from the centrifuge, come under the action of another high speed downward blast, which latter is generally high pressure air or steam. The glass streams are thereby attenuated into fine fibers which are cooled and discharged downwardly in the form of glass wool.

ANALYSIS OF THE PRIOR ART

It has long been recognized that it is desirable to produce glass fibers exceedingly small in diameter, for example on the order of a few microns, because products made with such fine fibers have remarkable advantages, including strength, good thermal insulating capability and other physical properties. Further, while the length of the fiber is more or less significant according to the purpose for which the fiber is to be used, it is generally desirable that the fibers be long rather than short. Still further, it is highly advantageous, particularly from the standpoint of the economics of fiber production, that a high production rate be utilized in the manufacturing process employed. One way to reach a high production rate is to have a high orifice pull rate. By "orifice pull rate" we mean to denote the amount of production accomplished within a given time from a single fiber producing center. "A single fiber producing center" means one orifice emitting one glass stream in the longitudinal blowing process, the strand process, and the centrifuging process, and it means one rod of glass in the aerocor process. In toration it means one glass cone from which a single fiber is drawn. Pull rates for a given process are typically given in terms of kilograms, or pounds, or tons, per hour, or per 24 hour period.

To summarize, it is generally desirable to make very fine fibers, very long fibers, and to make fibers at a high orifice pull rate, but these objectives conflict with each other, insofar as prior art processes are concerned. therefore it has always been necessary that a selection be made to sacrifice one or more desiderata in order to obtain the others. Further, each of the prior art processes can effectively serve to make only one or a narrow range of products. For example, by the strand process very fine continuous fibers can be made, but the orifice pull rate is low and the resultant product is not economically useable in the form of glass wool. On the other hand, the centrifuging process makes fibers at a relatively higher orifice pull rate but they tend to be short and they are produced in the form of wool and cannot be readily organized to make roving or other reinforcing products or textiles. The wool resulting from the centrifuging process is very satisfactory in products such as building insulation in which considerable ranges of fiber diameters and lengths in the finished product are satisfactory; however, where the insulation and product strength requirements are very high, other techniques of manufacture, such as the aerocor process, are generally employed.

The aerocor process makes long and fine fibers, if orifice pull rates comparable to those of the centrifuging process are used. But the aerocor process cannot be operated at an orifice pull rate high enough to effectively compete with the centrifugal process. As the orifice pull rate in the aerocor process is progressively increased, there is a corresponding increase, unavoidably, in fiber diameter, until a certain diameter is reached and if the orifice pull rate is increased even further, the glass rod utilized in the process will tend to pass through the gaseous blast without being completely melted and this results in the inclusion in the product of an unacceptably high number of bent pieces of relatively coarse glass fiber, these bent pieces being known as "hooks."

In the above described first longitudinal blowing technique the fibers in the bonded mat are long and uniform in diameter, but the orifice pull rates are relatively low. An attempt to increase the orifice pull rates generates unfiberized material having the shape of insufficiently drawn glass drops.

It is the prime characteristic of the invention to obtain fine and long fibers at very high orifice pull rates.

In the second longitudinal blowing technique the orifice pull rates can be very high, but the attenuating blasts break the glass streams prior to attenuation with the result that a large portion, even up to 50 percent, of the glass is unfiberized and lodges in the wool product in the form of slugs; further, the fiber is very short and irregular in diameter.

It is an important characteristic of the invention to obtain the fine and long fibers at high pull rates, as discussed above, while at the same time producing fiber practically free of unfiberized material.

Many prior workers have made repeated efforts to optimize the manufacture of glass fibers by one or more of the processes which start with molten streams of glass. Various of these prior art techniques have been concerned with trying to optimize the attenuation process by extending or lengthening the attenuation zone, either by providing special means to accomplish the addition of heat to the streams of glass and to the embryonic fibers 12, or through the use of confining jets 13 14, or both 15.

The approach taken in the just mentioned prior art technique suggests that the realization of optimum fiberization lies in extending the length of the attenuating zone.

Contrary to such teachings, in the practice of the present invention, attenuation is accomplished in the course of a short path length, on the order of one to two centimeters. Therefore, as will be more readily apparent from the explanation of the subject invention which follows, it is an important characteristic of the invention that the fibers are removed, very early in the process, to a cool zone, in which no further attenuation is possible.

Various other approaches have been suggested for introducing glass in the molten state into an attenuating blast 16 17 18 19. In such attempts to introduce a stream of molten glass into an attenuating blast it has been noted that there often is a tendency of the glass stream to veer to a path of travel on the periphery of the blast, that is, to "ride" the blast, rather than penetrating into the core region of the blast where attenuating conditions are more effective. Suggestions have been made to deal with this "riding" problem, including the use of physical baffles as in Fletcher 16, and the transfer of substantial kinetic energy to the glass stream as, for example, by the modifications of the centrifuging process taught in Levecque 11, Paymal 18, and Battigelli 19.

An alternate approach to the problem, more closely akin to the aerocor process, has been the introduction of the glass in the form of a solid 9 or pre-softened 20 glass rod or in the form of powdered glass 14.

In contrast, it is another important characteristic of the invention to introduce glass in the molten state, in a progressive and very stable way, into an attenuating zone where the attenuating parameters are the most efficacious.

BIBLIOGRAPHY OF PRIOR PATENTS (1) Slayter et al 2,133,236
(2) Slayter et al 2,206,058
(3) Slayter et al 2,257,767
(4) Slayter et al 2,810,157
(5) Dockerty 2,286,903
(6) Slayter et al 2,729,027
(7) Day et al 3,269,820
(8) Stalego 2,489,243
(9) Stalego 2,754,541
(10) Levecque et al 2,991,507
(11) Levecque et al 3,215,514
(12) Stalego 2,687,551
(13) Stalego 2,699,631
(14) Karlovitz et al 2,925,620
(15) Karlovitz 2,982,991
(16) Fletcher 2,717,416
(17) Eberle 3,357,808
(18) Paymal 3,634,055
(19) Battigelli 3,649,232
(20) Stalego 2,607,075

OBJECTS AND ADVANTAGES

In contrast with all of the foregoing, it is a major objective of the present invention to provide a technique for producing glass fibers (as well as the resulting fibers themselves) in which it is not necessary to sacrifice any one of the major desiderata above referred to, namely, fineness of fiber, long fiber length and high pull rate.

Because of the accomplishment of the above major object, with the technique of the present invention it is possible to produce fibers adapted to a much wider range of uses than has been practicable with any one of the presently known techniques.

The foregoing contrast is graphically shown in Table I:

TABLE I

| FIBERIZING PROCESS | PRODUCT RESULTS | | | |
|---|---|---|---|---|
| | Typical Fiber Length For A Given Diameter | Typical Range Of Average Fiber Diameters (microns) | Range Of Average Orifice Pull Rates (Kg/24 hrs./ Hole Or Rod Or Cone) | Unfiberized Or Waste Material (% Of Material Pulled) |
| 1. | | | | |
| Steam Blown Bonded Mat | Practically Continuous | 10 to 18 | 2 to 5 | Less Than 2 |
| Steam Blown Wool | Very Short | 7 to 14 | 10 to 50 | 15 to 50 |
| Low Pressure Air Blown Bonded Mat And Staple Yarn | Practically Continuous | 7 to 18 | 1 to 2.5 | Less Than 2 |
| 2. Strand | Continuous | 3 to 25 | .3 to 3 | 3 to 15 |
| 3. Aerocor | Long | .5 to 8 | .2 to 5 | .5 to 4 |
| 4. Centrifuging | Short | 1 to 15 | .5 to 7 | .5 to 2 |
| 5. Toration | Very Long | .5 to 10 | .5 to 50 | Less than 2 |

Another object of the invention is the provision of a technique for producing mineral fibers which is readily adaptable to adjustment of operating conditions so as to selectively produce fibers adapted to a wider variety of uses than has been practicable heretofore. The broad range of fiber types and characters capable of being produced by the technique of the present invention makes it unnecessary in many situations to rely upon more than one technique or process for various different products. In the glass fiber industry this presents outstanding advantages because of the capability of producing a wider range of products with a single technique, thereby eliminating substantial investment in capital equipment which would otherwise be required in order to produce the same range of products by presently known or conventional techniques.

The invention further has in view the provision of a technique for producing glass fibers in which various limitations of the prior art techniques are eliminated. For example, the technique of the present invention requires only static equipment, in contrast with the widely used centrifuge method in which the fiberizing equipment rotates at high speed, thus necessitating special high precision machinery and maintenance. Static equipment makes it possible to construct the equipment from materials which have very high strength at high temperatures in static conditions, without the need to have high temperature strength in dynamic conditions. This allows fiberizing a broader range of materials.

As another example of eliminating prior art limitations, the technique of the present invention greatly simplifies and facilitates the introduction of molten glass into the interior of a blast for purposes of attenuation, the means or system for accomplishing such introduction of the glass in the process of the invention being explained more fully hereinafter. This feature of the invention is in striking contrast to various of the prior art systems for introducing glass into an attenuating blast, such as the aerocor process above described, in which a solid glass rod is fed into the blast, to be softened and melted. As above pointed out this type of system is severely limited with respect to pull rate and has a tendency to develop "hooks." In contrast, the feed of the molten glass into the attenuating zone within the torating blast in the technique of the present invention makes possible much higher orifice pull rates than are possible with the aerocor process, and this is accomplished with the technique of the present invention with a negligible amount of unfiberized material and moreover, while maintaing fineness of fibers.

A still further object of the present invention is to provide a technique for making mineral fibers in which a wider variety of batch formulations may be utilized in the making of fibers, over a wide range of fiber properties or characteristics, than is possible with any one of the presently known processes.

The foregoing and other objects and advantages which are attained, including numerous specific advantages flowing from toration will be explained more fully hereinafter.

THE DRAWINGS

FIG. 1 is a diagrammatic representation of the major components of one system according to the invention, showing the general interrelation of the components for producing a blast and for producing a jet transverse to the blast, as well as the glass supply means and the fiber collection device.

FIGS. 1A, 1B and 1C are fragmentary sectional views of parts of a system such as is shown in FIG. 1, but on an enlarged scale as compared to FIG. 1, these views being taken in the region of introduction of the glass, FIG. 1A showing the effect produced by the blast acting alone, FIG. 1B showing the effect produced by the jet acting alone, and FIG. 1C showing toration, i.e., the effect of the interaction of the jet and blast on the glass when both the jet and blast are operating according to the invention.

Figure 2A:
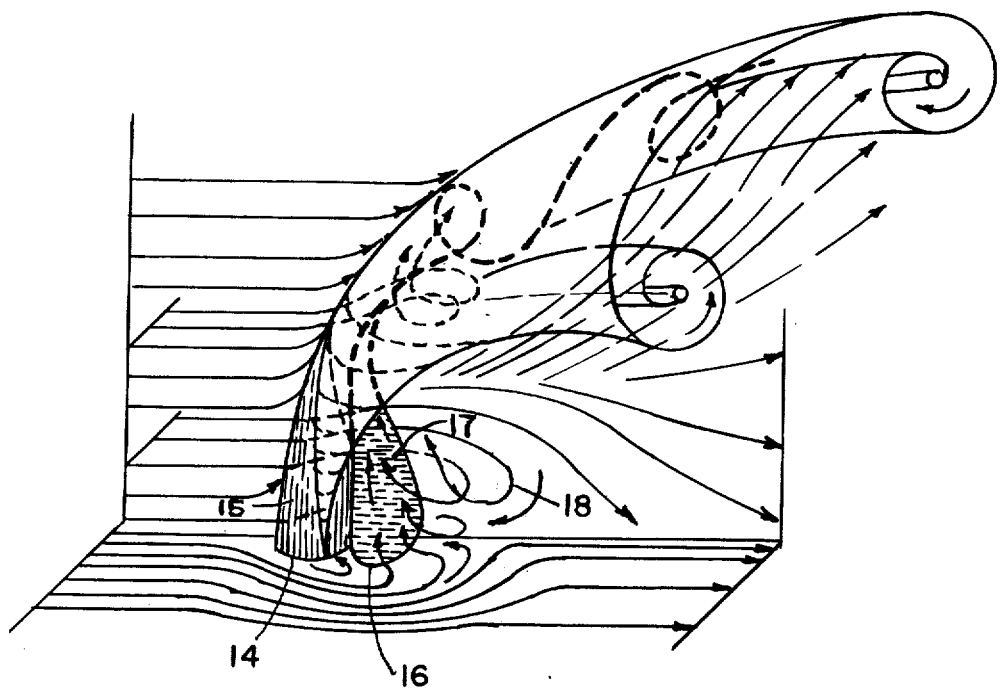
FIG. 2A is a diagrammatic perspective view, on an enlarged scale as compared to FIG. 2, of the zone of interaction depicted in FIG. 2.
Figure 2B:
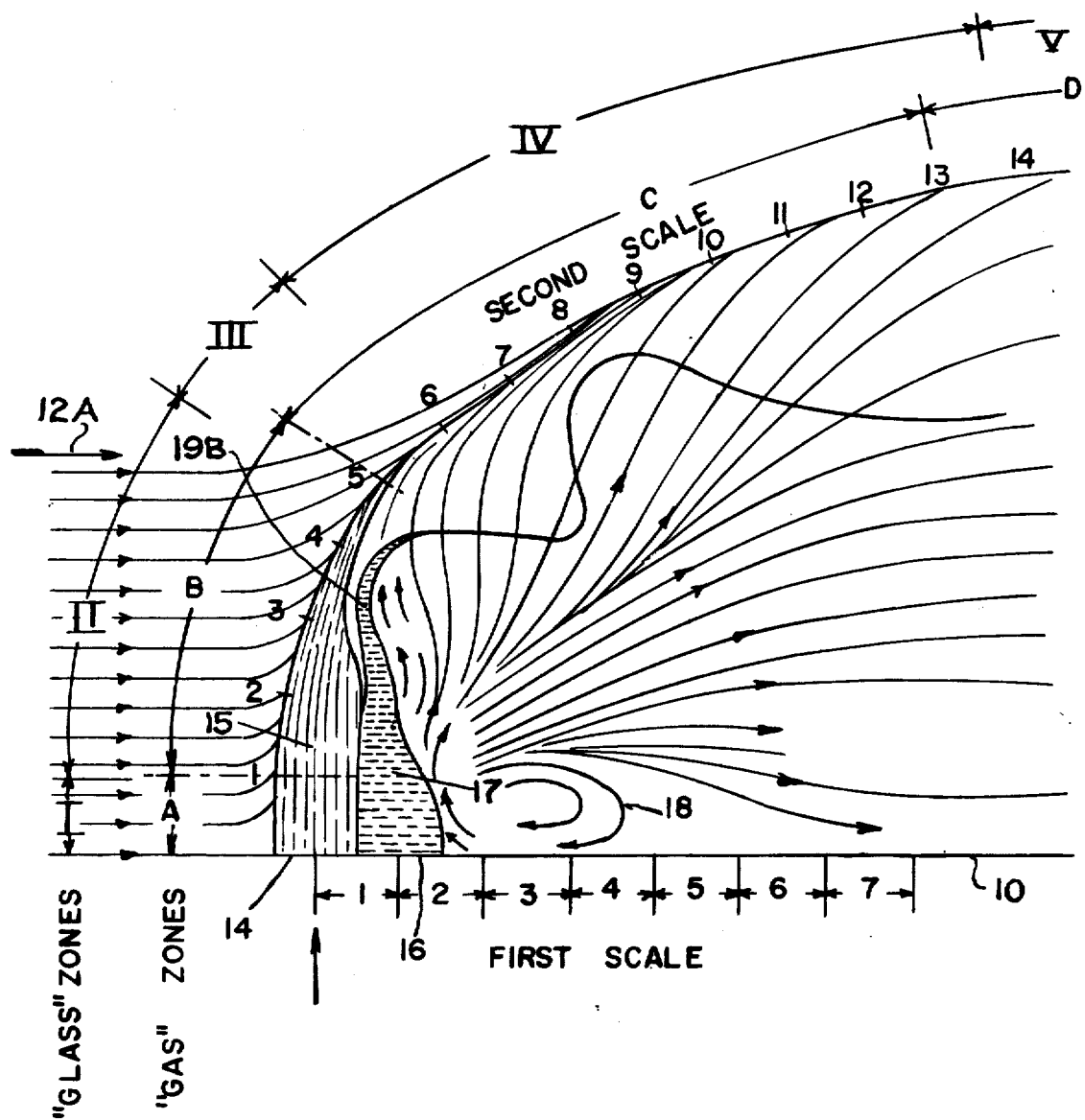
FIG. 2B is an elevational view of the zone of interaction shown in FIG. 2A, this view being a partial sectional view with respect to various of the flow lines indicating the flow of gases.
Figure 2E:
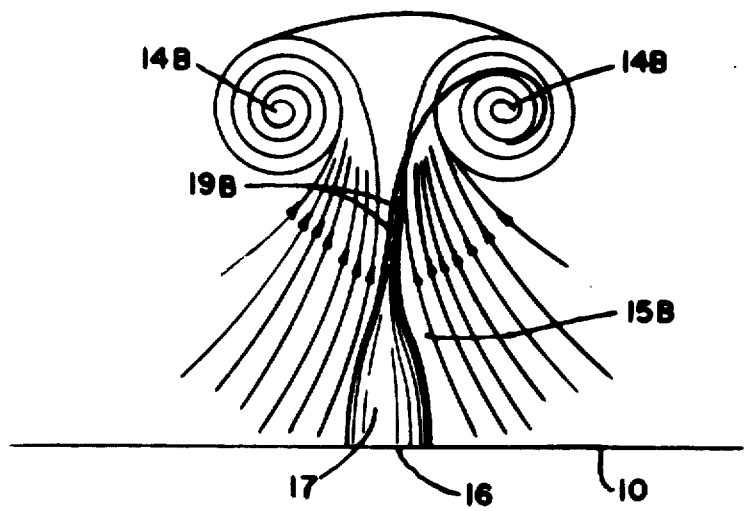
FIG. 2 is a diagrammatic side elevation showing a pattern of flow of gases and glass which is typical of toration, this view being inverted as compared with FIGS. 1, 1A, 1B and 1C, that is, showing the glass and jet flowing upwardly instead of downwardly.
FIG. 2C is a horizontal sectional view of the zone of interaction shown in FIG. 2, on an enlarged scale as compared to FIG. 2, taken at the section line 2C indicated on FIG. 2.
FIG. 2D is a section similar to 2C but taken at the section line 2D indicated on FIG. 2.
Figure 2F:
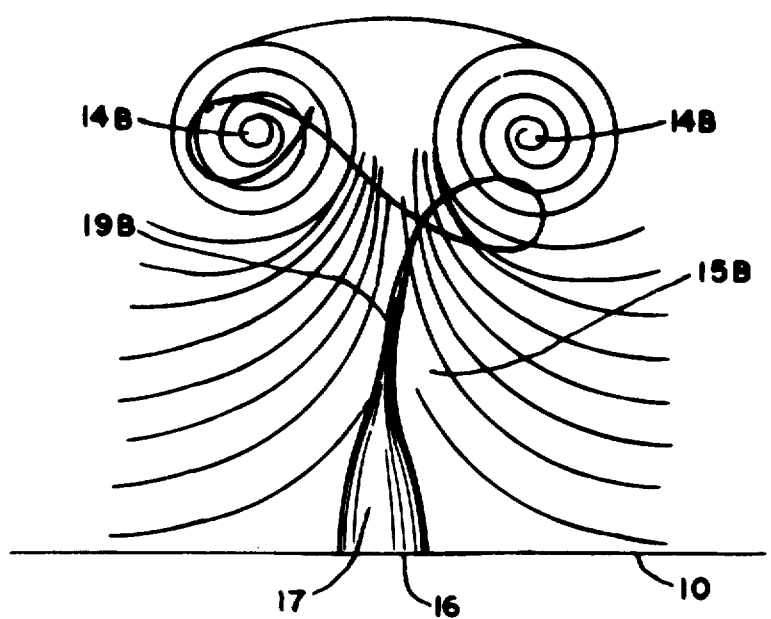
Figure 2G:
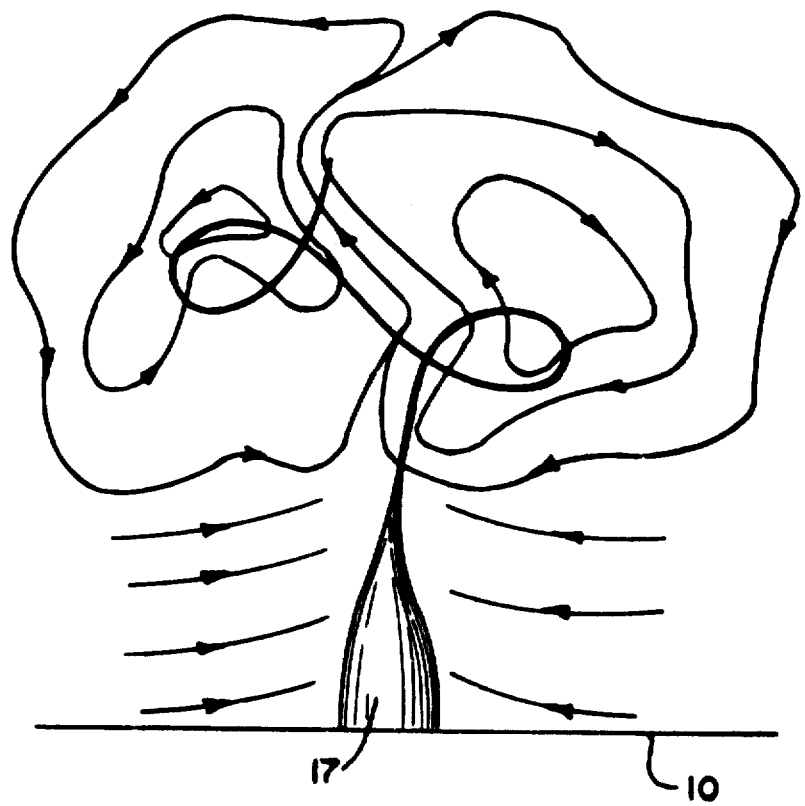

FIGS. 2E, 2F, and 2G are vertical sections taken respectively on the section lines 2R, 2F, and 2G indicated on FIG. 2, but on the scale of FIGS. 2C and 2D rather than on the scale of FIG. 2.

Figure 2H:
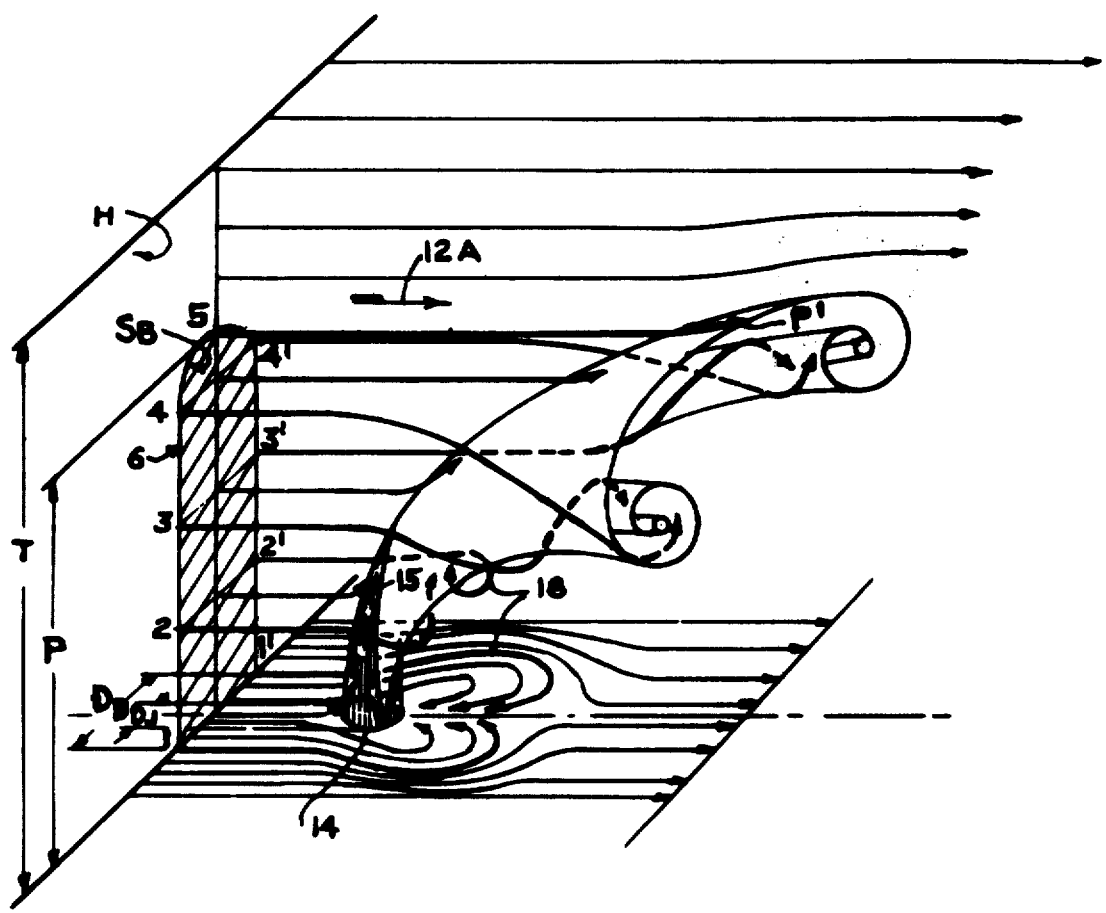

FIG. 2H is a diagrammatic perspective view, generally similar to FIG. 2A, but with the glass entirely omitted, for the sake of clarity, and with certain gas flow aspects illustrated with relation to a plane shown perpendicular to the blast and just upstream from the jet.

FIG. 3 is a fragmentary sectional view showing an embodiment in which a plurality of fiberizing centers are provided, these being arranged in successive rows and also on opposite sides of the blast.

FIG. 3A is a fragmentary sectional view showing another embodiment in which a plurality of fiberizing centers are provided, these being arranged in successive rows, similar to the lower portion of FIG. 3.

FIG. 4 is a fragmentary sectional view of another embodiment incorporating a plurality of fiberizing centers and showing a special arrangement which aids in avoiding having the upstream centers interfere with the fiberizing centers located downstream thereof.

FIG. 5 is a fragmentary sectional view, similar to FIG. 4, showing another embodiment having plural fiberizing centers, this view illustrating another arrangement for aiding in avoiding having the upstream centers interfere with the downstream centers.

FIGS. 6 and 7 represent sectional and isometric views, respectively, of an alternative method of supplying attenuable material to a system operative in accordance with the principles of the present invention.

FIG. 8 represents another arrangement for supplying attenuable material to the zone of interaction between the jet and blast employed.

FIGS. 9A, 9B and 9C show still another embodiment of apparatus for manufacturing fibers in accordance with the principles of the present invention, FIG. 9A showing the general arrangement, FIG. 9B showing certain parts in enlarged section taken as indicated by the section line 9B on FIG. 9C, and FIG. 9C being an enlarged plan view of the parts shown in FIG. 9B.

Figure 10:
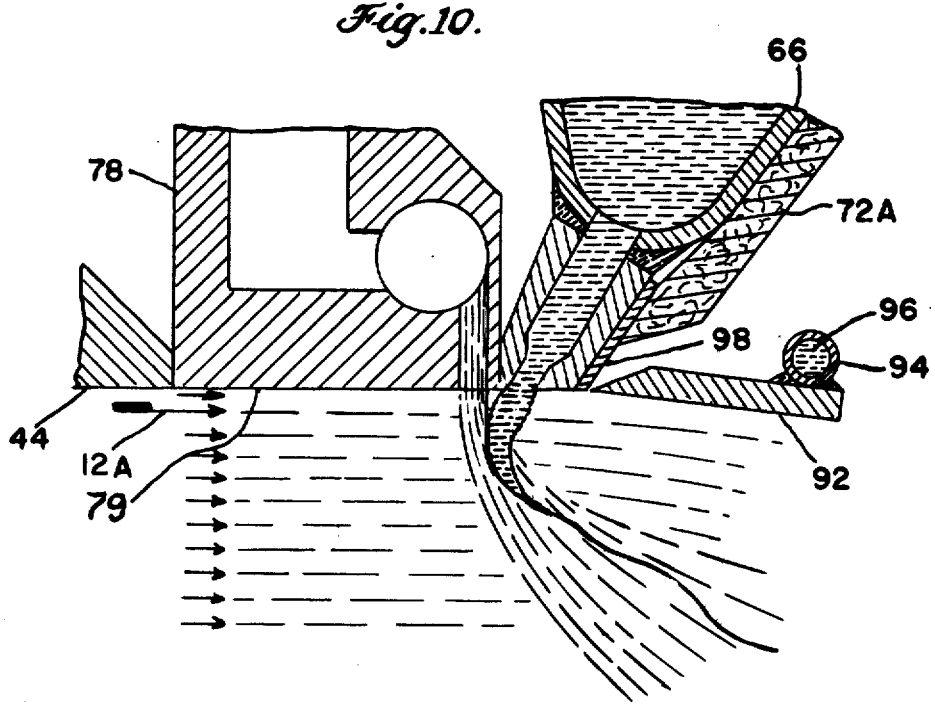

FIG. 10 is a sectional view of another embodiment, in which a water cooled plate is utilized adjacent the path of the blast downstream of the fiberizing center.

Figure 11:
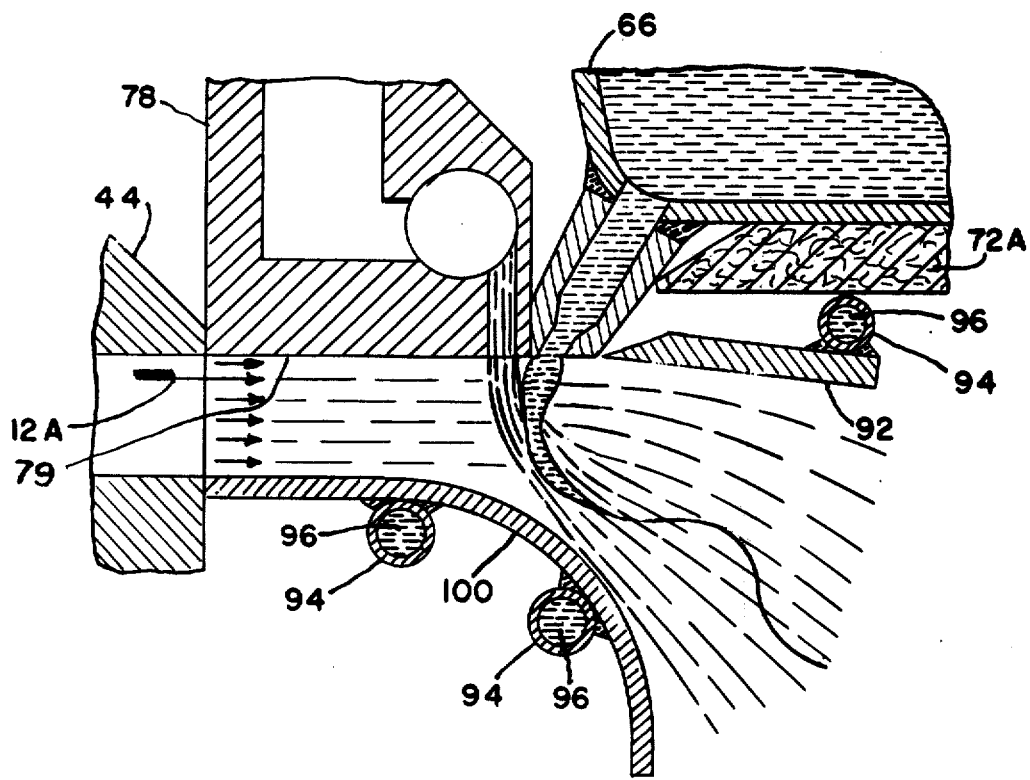

FIG. 11 is a view similar to FIG. 10 but further showing the use of a water cooled deflector adjacent the side of the gas blast opposite to the fiberizing center.

Figure 12:
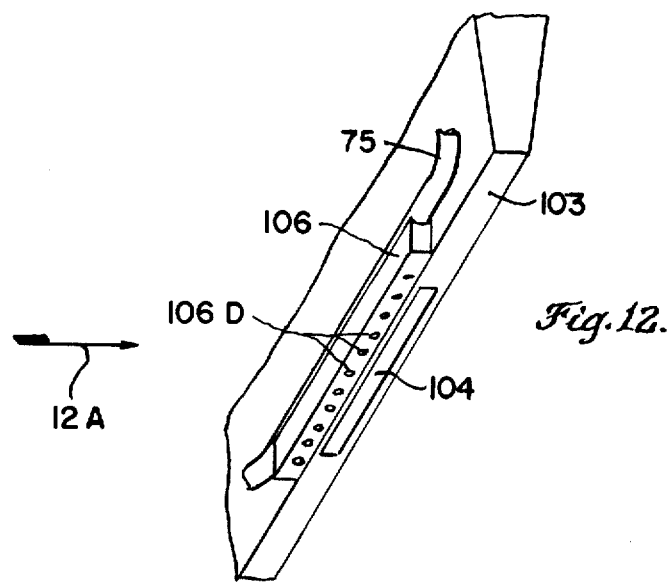

FIG. 12 illustrates still another feature contemplated for use, i.e., the provision of a slot shaped orifice for feeding attenuable material into the interaction zone from the crucible, the slot being shown in association with a row of series of jet emitting orifices. This view is a perspective view, taken from a position below and to one side of the fiberizing station.

Figure 12A:
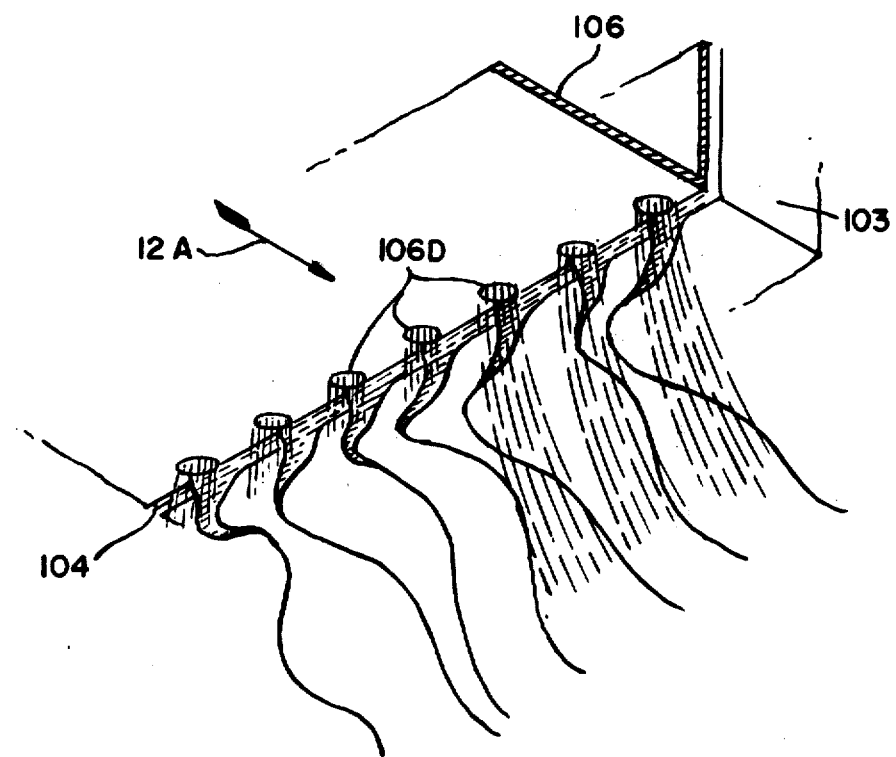

FIG. 12A is a perspective view, taken from an angle of observation similar to that used in FIG. 12, of equipment of the general kind shown in FIG. 12, that is, equipment utilizing a glass emitting slot associated with a plurality of jet orifices, this view being on an enlarged scale as compared to FIG. 12, and showing a plurality of glass cones emanating from the slot and a glass fiber being torated from each cone.

Figure 13A:
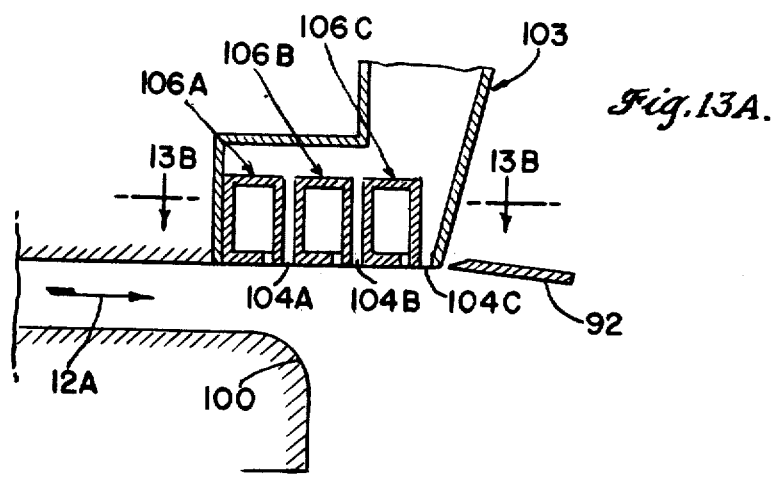
Figure 13B:
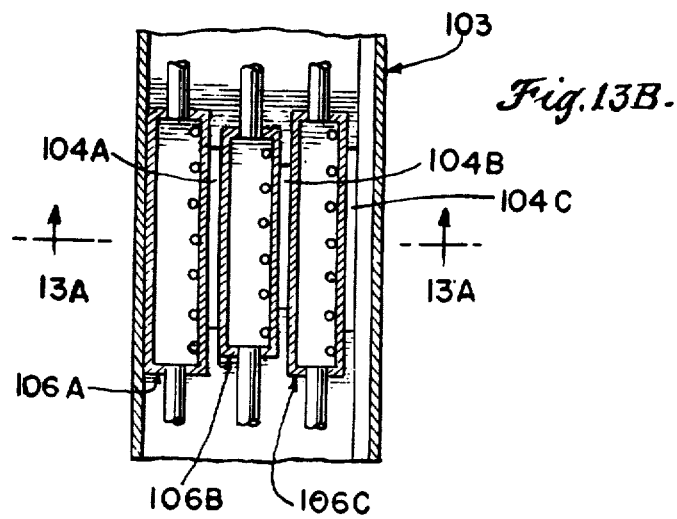

FIGS. 13A and 13B are sectional views illustrating a further variation in the equipment which may be employed, which yields a high density of fibers from a single blast by providing plural rows, each row in turn being equipped with plural fiberizing centers, FIG. 13A being taken as indicated by the line 13A on FIG. 13B and FIG. 13B being taken as indicated by the line 13B on FIG. 13A.

FIGS. 14A, 14B, 14C and 14D are, respectively an isometric view and various sectional views of another form of apparatus usable in the practice of the present invention, the sectional views 14B, 14C and 14D being taken as indicated by the section lines 14B, 14C and 14D on FIG. 14A.

Figure 15D:
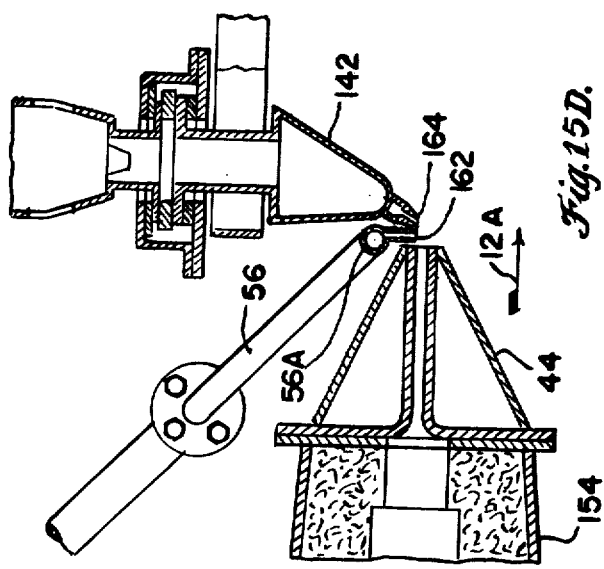
Figure 15C:
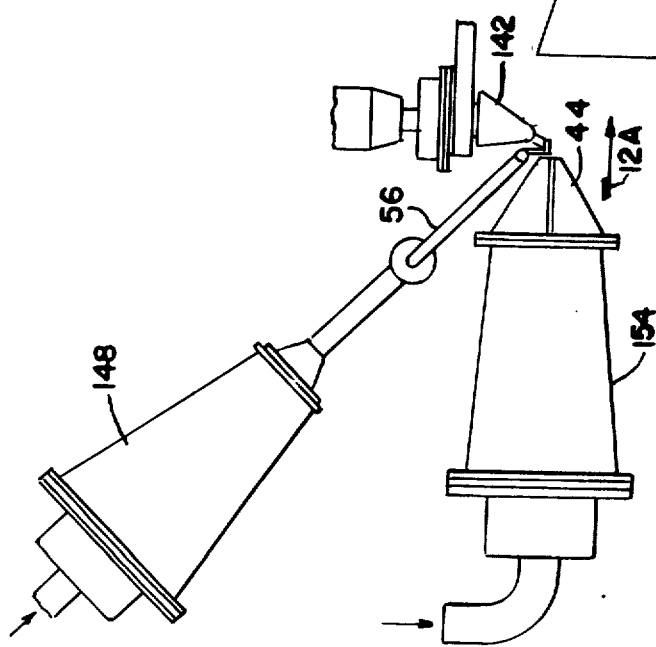

FIGS. 15A, 15B, and 15D are views illustrating equipment which may be employed for relatively large scale production, FIGS. 15A and 15B being elevational and plan views, respectively, showing the general arrangement of the major components, FIG. 15C being an enlarged elevational view of the equipment at one fiberizing center and FIG. 15D being a still further enlarged sectional view at the fiberizing center of FIG. 15C.

TORATION

The terms "toration," a noun, and "torate," a verb, as mentioned above and as used herein, constitute contractions of the words "torando" and "attenuation" and are used to denote the action on an attenuable material in ther zone of interaction created when a blast, or first jet, is penetrated by a transversely oriented second jet, the latter being completely encompassed or enveloped by the former. Clearly defined and forceful currents, including two counterrotating tornadoes, or whirls, or vortices, having substantial angular velocity, are generated by the interaction of the two jets, and these currents, by frictional licking or sweeping against the surface of the attenuable material, exert forces tending to induce the attenuable material to flow toward and into the zone of interaction; the material then is brought more and more under the influence of the torandoes and forms itself into an elongated cone from the tip of which a fine fiber is drawn by the combined flows of the jets. It is surprising that, although located in a whirling zone with very high velocities, the glass cone nevertheless is stable and that its cross section reduces progressively from its base at the plane of emission to its tip, from which a single fiber starts. It is also very surprising that this fiber, although, at least part of the time, it has a nearly helicoidal movement at an increasing amplitude and velocity, continuously emanates from the cone in a continuous attenuation process.

The virtual lack of slugs in the fiber manufactured by toration is due to the dimensional and positional stability of the glass cone and to the continuity of the unique fiber attenuation.

The interaction phenomenon as described hereabove and which is of fundamental importance to the invention, can occur with a plate limiting one of the borders of the blast and through which the secondary jet is flowing. This same phenomenon can take place in embodiments, such as that of FIG. 12 described hereinafter, in which the plate is so small that it is virtually nonexistant, or even without any plate. The interaction phenomenon is essentially the same, whether or not there is a plate. Since we prefer to employ at least some form of plate, although it may be quite limited extent, in the following description we emphasize embodiments in which there is a plate.

FIGURE 1

Referring first to FIG. 1, a blast, or primary jet source, as indicated at the left, being arranged to deliver the blast along a surface, in this case the undersurface, of a plate or wall 10. The source of a secondary jet is also indicated, being arranged to deliver through the plate 10 so as to penetrate into the blast. The attenuable material, such as glass, is also delivered through the plate 10, and in the embodiment of FIG. 1 the point of delivery of the glass into the last is just downstream of the point of delivery of the jet into the blast. An appropriate fiber collection means is indicated at the right in FIG. 1.

FIGURES 1A-B-C

Figure 1A:
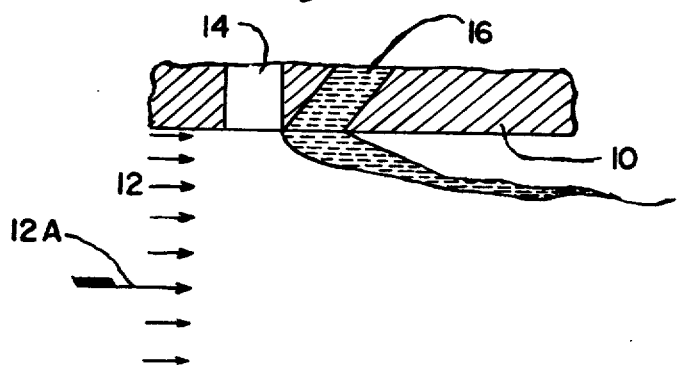
Figure 1B:
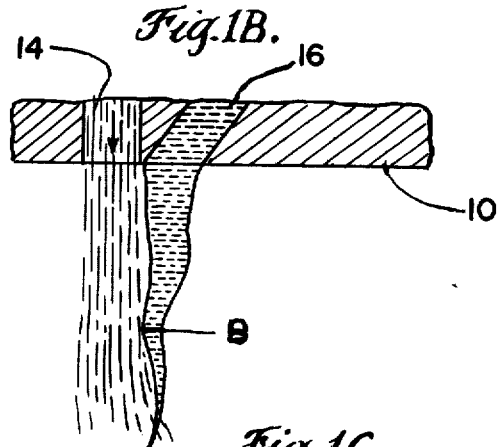
Figure 1C:
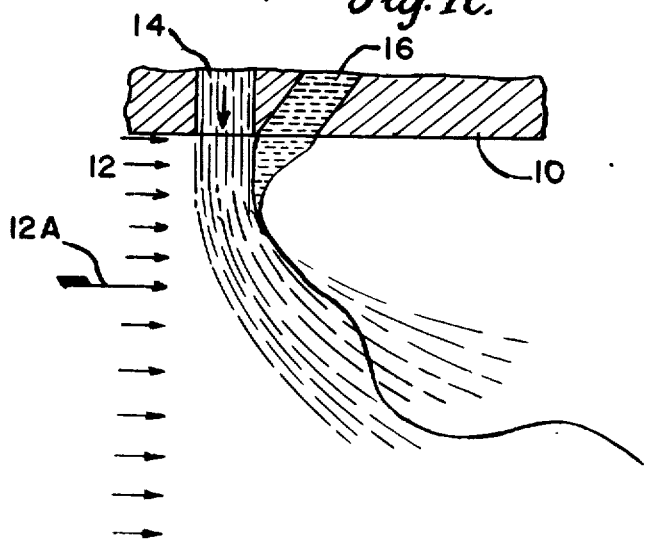

In order to more fully understand toration, reference is now made to FIGS. 1A through 1C, these being enlarged sectional views in the region of introduction of the glass and which depict, in rudimentary form, the conditions necessary to give rise to toration, and which also contrast the relative effect of the various operative components. FIG. 1A and 1B depict operating conditions which, because of the absence of one or another of the necessary components of toration, fail to produce a result other than that which might normally be expected in light of the components which are present. In contrast, FIG. 1C depicts the situation when the necessary components are all present and operative and shows the glass being torated into a fiber.

In each of the FIGS. 1A through 1C there is disclosed a plate or wall member 10 which presents a flat and smooth surface to a principal jet 12, the latter being alternatively referred to as a blast. The blast is depicted in general by arrows and is specifically identified in these and other drawings by the presence therein of the feathered arrow 12A. The plate 10 is licked by the blast 12 as are the orifices 14 and 16, the former being used to conduct a secondary jet 15 transversely and penetratingly into the principal or primary jet. Orifice 16 is used to conduct the attenuable material 17, e.g., molten glass, to the path of the principal jet, entering it just downstream of the secondary jet.

As mentioned above, FIGS. 1A and 1B depict in somewhat diagrammatic fashion the effect on the glass in the absence of one another of the operative components of toration. Thus, FIG. 1A depicts the complete absence of a secondary jet. Having been emitted in the peripheral layer of the blast 12, the attenuable material cannot reach the core of the blast. As a consequence the attenuable material flows practically directly downstream under the influence of the blast, i.e. it "rides" on the blast, and is soon undesirably far downstream in a region where the temperature and velocity are too low to produce a fine fiber.

In FIG. 1B there prevails the inverse situation to that depicted in FIG. 1A in that the secondary jet and the attenuable material are both present, however, no principal blast is present. As a result the attenuable material is only slightly influenced by the secondary jet, coming into contact therewith a substantial distance from the plane of emission, at the point B, and then only slightly, so that no substantial attenuation is effected.

In contrast to the results obtained in FIGS. 1A and 1B above described, FIG. 1C depicts the situation in which all of the operative components of toration are present. It will be noted that the attenuable material is strongly attracted to, or sucked against, the downstream side of the secondary jet, the result being effected by the interaction of the principal and secondary jets, and that a fine long fiber is produced.

We have found that broad ranges of values for the various operating parameters can produce the desired results.

GENERAL STATEMENT OF VARIABLES

One possible way to control the quantity, quality, and size of the resulting fibers is by regulating the flow rate of the attenuable material. The regulation of the flow rate of attenuable material can be accomplished in a number of ways, e.g., by varying the temperature of the attenuable material so as to alter its viscosity characteristics. In the case of glass, generally speaking, the higher the temperature the lower the viscosity; further, when changes in the constituents of the glass are made so as to obtain different fiber quality, in view of its end use, such changes in the constituents of the glass can effect changes in the viscosity at a given temperature.

Other parameters which can be manipulated in order to control toration include the blast and jet fluid compositions, and the temperatures and the velocities of the blast and the jet. Typically, the interacting jets are composed of the same fluid, such as the products of combustion resulting from the burning of a suitable gaseous fuel, and in such circumstances the performance of toration, throughout a considerable temperature range, can be gauged in terms of the relative velocities of the primary and seconday jets. However, it must be kept in view that any substantial difference between the densities, or the viscosities, of the two jets can have a quite considerable impact on toration, and these additional factors can be accommodated in toration by taking account of the kinetic energies of the fluid streams, rather than just their velocities. As explained in more detail hereinbelow, the kinetic energy of a given volumetric unit of a fluid stream is directly proportional to the product obtained by multiplying its density by the square of its velocity.

In order to effect toration, the kinetic energy of the jet per unit of volume must be greater than that of the blast in the operational area thereof, as hereinafter defined.

Additional control over the results obtainable by toration can be exercised by varying the orifice sizes, positions and configuration, particularly with respect to the secondary jet. Additional refinements to the basic apparatus are discussed below with respect to the various illustrated embodiments of the present invention.

ANALYSIS OF TORATION-FIGURES 2 to 2H

In further explanation of the operative forces responsible for toration, reference is made to FIGS. 2 and 2A through 2G which present, in part, our actual observations and, in part, our theoretical suggestions and conclusions as to the zone of interaction created by intersecting jets and as to the resultant fluid flow which give rise to the whirl or miniature tornado phenomena hereinbefore referred to as being of importance in toration. The FIG. 2 series of drawings shows the secondary jet in inverted position as compared to the FIG. 1 series, that is the jet is directed upwardly instead of downwardly, and further the FIG. 2 series is on a very much enlarged scale as compared to the FIG. 1 series. It is to be understood that the toration fiberizing center may be arranged in any desired relation to the horizontal.

In the representation of toration as appearing in FIGS. 2, 2A and 2B, the principal jet or blast 12A travels from left to right, parallel to the plane 10. The secondary jet 15 is oriented substantially perpendicular to the principal jet and, in a sense, can be said to intercept it, with respect to a part of the blast. The relative relationship of the principal jet and the secondary jet is such that the secondary jet is completely enveloped by the principal jet. The significance of this operative relationship will become more readily apparent from the analysis of the complete process of toration which is presented herebelow.

In further explanation of the FIG. 2 series of views, it is convenient to delineate certain regions or zones which characterize the activity of the interacting jets and of the material being attenuated. Since the zones convenient to a consideration of the flow of the jets do not necessarily coincide with the zones convenient to a consideration of the path of travel of the material being attenuated, two sets of zones have been adopted, both sets being indicated on FIGS. 2 and 2B. The one is a lettered set, zones A to D, used in describing the interacting jet fluids, and the other is a numbered set, zones I to V, used in describing what happens to the material being attenuated.

For convenient reference, the zones relating to the activity of the interacting fluid jets, that is, the lettered zones A to D, appear in FIGS. 2 and 2B next to the legend "gas" zones, and the zones relating to the material being attenuated, that is, the numbered zones I to V, appear next to the legend "glass" zones. With respect to both sets of zones, they are taken along a curved line which is generally parallel to the path of the leading edge of the secondary jet (and an extension of such path in the general direction of the mixed flows in the upper reaches where there is no longer any identifiable leading edge of the secondary jet).

Reference herein is repeatedly made to "upstream" and "downstream"; unless the context clearly requires a different meaning, these terms have reference to the flow of the blast 12A.

Two scales are included, both of which are marked off in secondary jet orifice diameters, the first scale being taken parallel to the plane of the surface of the plate through which the jet and glass emerge into the system, and the second scale being taken along the curved line just mentioned, that is, the curved line extending generally along the path of the leading edge of the secondary jet. Both scales appear in FIG. 2B, whereas just the first scale appears in FIG. 2. Note that the first scale is marked off from a beginning point which is the center of the secondary jet, and the second scale is marked of from a beginning point lying within the plane at the surface of the plate.

In considering the following discussion of both of the sets of zones, it must be kept in mind that, although as appearing in the drawings it would seem that there is a clear line of demarcation between one zone and the next, in actuality there is no sharply differentiatable separation between the zones, but rather a transition region. In other words, the chief characteristics exhibited in a given zone tend to taper off and be replaced by the chief characteristics exhibited in the next zone. Nevertheless, the zones are sufficiently separable so that it is useful to an understanding of the invention to analyze them in some detail.

The discussion that follows with reference to the zones illustrated in FIGS. 2 and 2B is summarized in Table II.

TABLE II

| Column (1) | Brief Summary of Toration with Reference to Interacting Jet Fluids Column (2) | Extent of Zone as Measured in Secondary Jet Orifice Diameters Taken Generally Along the Path of the Leading Edge of the Secondary Jet | | Brief Summary of Toration with Reference to the Attenuable Material Column (5) | Column (6) |
|---|---|---|---|---|---|
| | | Column (3) | Column (4) | | |
| Zone A | Inception of Tornadoes and Formation of Negative Pressure Region | 1 – 2 | 1 | Input and Localization | Zone I |
| Zone B | Formation of Double Volute and loss of Identity of Secondary Jet | 3 – 5 | 3 – 4 | Continuous Progessive Reduction in Cross Section Resulting in the Formation of a Stable Cone | Zone II |
| Zone C | Evolution of Tornadoes, Expanding Their Diameters. End of Deflection in Downstream Direction | 7 – 10 | 3 – 4 | Drawing of Fiber Material in Attenuable Condition by Concentrated Deployment of Energy Generated in Zones III, IV and V | Zone III |
| | | | 8 – 15 | Imparting of Energy to Fiber by High Speed Whipping; Quick Cooling | Zone IV |
| Zone D | Loss of Identity and energy of Tornadoes Reestablishment of General Downstream Flow | Minimum 3 – 5 | | Carry away and Collection | Zone V |

Table II is organized with the four "gas" zones identified in Column 1 and the five "glass" zones identified in Column 6. Column 2 contains a brief statement of the gas activity in each of the gas zones and Column 3 sets forth an indication of the size of each of the gas zones measured in secondary jet orifice diameters. Column 5 is similar to Column 2 except that it refers to the glass activity, and Column 4 is similar to Column 3 except that it refers to the sizes of the glass zones.

ZONES OF JET INTERACTION ACTIVITY

Zone A

Zone A lies next to and along the surface of the plate through which the secondary jet and glass are delivered. Zone A extends considerably in a lateral sense and in an upstream-downstream sense, as is described in more detail herebelow. It extends perpendicularly to the plate a distance of about 1 or 2 secondary jet orifice diameters. In Zone A the blast, sometimes called the primary or principal jet, strikes the portion of the secondary jet which is nearest to the plate, this being the portion of the secondary jet which is the strongest and most clearly defined. In a sense, it can be said that the secondary jet in Zone A presents an obstacle to the flow of the blast. The blast splits and flows around the secondary jet in Zone A while the secondary jet substantially maintains its thrust and its integrity, and can be said to pierce through the blast in Zone A.

Since the secondary jet is unconfined (in the sense that it is not within a tube or other solid-walled flow passage), its flow at its periphery induces some fluid of the blast to flow along with it, that is, some fluid of the blast is carried along with the flow of the secondary jet. The presence of the plate or surface through which the secondary jet is delivered does not fundamentally modify the just described obstacle effect and induction effect of the secondary jet, but it does give rise to a boundary layer effect. The combined effects (obstacle, induction and boundary layer) generate a region of relatively reduced pressure that is, negative pressure, immediately downstream of the secondary jet.

The split portions of the blast flow around the secondary jet toward the negative pressure region and thus rejoin each other to form strong recirculation currents shown in FIGS. 2A, 2B and 2C by blast flow arrows 18 which curve right around on themselves, and also curve upwardly, and indicate flow having a component generally from right to left, countercurrent to the blast which, as above mentioned, is flowing generally from left to right.

The extent of the negative pressure region is a function of the ratio of the kinetic energies, per unit of volume, of the blast and jet. In the upstream-downstream sense the negative pressue region extends about 2 to 3 jet orifice diameters and in the lateral sense it extends about 1 to 2 jet orifice diameters.

The zone of interaction of the blast and the jet gives rise to the formation of two oppositely rotating tornadoes, or whirls, one on each side of the secondary jet slightly downstream of the midpoint thereof. As clearly shown in FIG. 2A, these two tornadoes, which begin in Zone A next to the plate as pinpoint, or embryonic, vortices, swell substantially as they whirl upwardly and turn in a downstream direction.

The section shown in FIG. 2C is taken in an upward direction from a position substantially at plate level in Zone A and clearly shows the recirculation currents and the embryonic tornadoes, which are of quite small section at this level.

The section of FIG. 2D is similar to orientation to FIG. 2C but it is taken just above the plate, about at the transition region between Zones A and B. A comparison of FIGS. 2C and 2D reveals the swelling of the still embryonic tornadoes.

From FIGS. 2C and 2D it can be seen that the flow of the blast 12A is relatively undisturbed except in the region immediately surrounding the jet 15. Zone A extends throughout this region of disturbance; upstream of the secondary jet only a short distance, downstream a considerable distance, and laterally as far as the outermost of the flow lines 18 which curve around, or recirculate.

Thus, from the point of view of the interacting jets, Zone A is characterized by the inception of the two oppositely rotating tornadoes and by a region of negative pressure immediately downstream of the base of the secondary jet, the negative pressure being quite pronounced in the region between the bases of the tornadoes and in the region immediately downstream thereof.

Before turning to Zone B, it is pointed out that, as with the two tornadoes, the flow of the secondary jet, which begins at the plate in a direction substantially perpendicular to the blast, is deflected, or turns, to a generally downstream direction as it passes further into and merges with the blast. This deflection of the jet and tornadoes, which barely begins in Zone A, is completed in Zones B and C, and occurs along a path which is about 10 to 13 secondary jet orifice diameters long, measured along the upstream side of the secondary jet, that is, along the second scale shown in FIG. 2B.

Zone B

Zone B extends from Zone A upwardly approximately 3 to 5 secondary jet orifice diameters, measured along the second scale shown in FIG. 2B. In Zone B, due to the induction effect described in connection with Zone A, the peripheral layers of the secondary jet progressively mix with the adjacent layers of the blast, and consequently the thickness of the mixing layer increases as the secondary jet core progressively loses its identity and disappears. At the level at which FIG. 2D is taken, there is still a remaining core, indicated at 15, which has clear, identifiable flow characteristics separate from the blast. Zone B ends when the secondary jet core disappears.

As the secondary jet loses its individuality, that is, its initial velocity and direction characteristics, it gives rise to a new flow, a mixture of the jet and blast which can be called a torating flow or torating blast, and this mixed flow is established by the end of Zone B.

The downstream deflection of the secondary jet core and turbulent mixing layer is accompanied by a reduction of the cross section of the core and a deformation of the cross section of said mixing layer. As seen in FIG. 2D, the deforming cross section flattens and elongates laterally of the blast, and its lateral edges progressively roll up to take the form of the two quasi-conical tornadoes, or vortices, already described. The deformed cross section is similar to the double volute design traditionally used at the top of an Ionic column.

The layers of the blast which are adjacent the jet and flow alongside it give the tornadoes their direction of rotation. As a result of this direction of rotation, a fluid particle placed on the outer layer of either tornado would be carried over toward the concavity of the above mentioned double volute, being caught by the two tornadoes like between two counter rotating calender rollers.

While the outer layers of the tornadoes rotate at velocities which are identical to the velocities of the layers of the blast adjacent the tornadoes, the interior or central portion of each of the tornadoes turns around its own axis at very high speed. THus, each tornado has an induction effect, in an inward and upward direction, on the adjacent portions of the blast which are flowing around the secondary jet. The induced flow is directed upwardly along and inwardly into the concavity constituting the deformed shape of the residual secondary jet flow and of the mixing layer.

The vortices grow very substantially in cross section during their travel through Zone B and rather dearly form between themselves an envelope, or gaseous shield, which serves as a deflector to the main stream of the blast.

It is surprising that, while the fluid flows at very high velocities in the central portion of each of the tornadoes, these tornadoes are nevertheless stable; their apexes appear to be affixed to the edge of the secondary jet orifice, slightly downstream of the axis thereof, and the gaseous envelopes of the tornadoes are practically immobile.

Zone C

Zone C, which extends about 7 to 10 secondary jet orifice diameters along the second scale, is the region in which the residual flows of the secondary jet and of the tornadoes substantially complete the deflection into the downstream direction; the secondary jet has now lost its indentify and given birth to a mixed flow, or torating flow; the two tornadoes still further expand in diameter and still maintain the envelope or shield above described. However, toward the latter portion of flow in Zone C, the tornadoes begin to lose their identity. The sections illustrated in FIGS. 2E and 2F are taken in Zone C and show the tornadoes 14B.

In further explanation of the interaction of the blast and jet zones A, B and C, attention is now directed to FIG. 2H, a view generally similar to that of FIG. 2A but with the glass entirely omitted, for the sake of clarity, and with certain gas flow aspects illustrated with relation to plane H, which is perpendicular to the blast at a location just slightly upstream from the jet that is, upstream a sufficient distance for the flow of the blast to be undisturbed by the interaction phenomenon.

VELOCITY AND ENERGY OF BLAST AND JET (PART A)

As a general rule, in order for the jet to be able to penetrate into the blast, it is necessary, as described in more detail herebelow, that the kinetic energy of the jet exceed that of the blast at the point of penetration. The depth of penetration of the jet 15 into the blast 12A, which blast is of total thickness T, is an important aspect of the interaction between the jet and the blast. In general it can be said that the stronger the jet, with relation to the blast, the deeper will be the jet penetration.

In FIGS. 2 and 2H, point P' located on the leading edge of the mixing zone at the end of zone C (where, as formerly stated, deflection is ended) indicates the extreme upper limit of the mixing flow in the blast.

As shown, a portion of the blast engages or interacts with the jet, but, further, a portion of said blast, which is farther away from the plane of emission, is deflected. Thus, the blast flow lines which are above point P' are deflected upwards (due to the deflecting effect of the mixing flow) following which they escape from the zone of interaction and continue on their way downstream without being captured or sucked or induced into the zone of interaction. On account of this deflecting effect, the flow line which passes through point P' crosses plane H at a point 5 located at a distance P from the plane of emission, i.e., closer to the plane of emission than point P'. As the flow line farthest away from the plane of emission but still taking part in the interaction passes through point 5, we shall refer to P, i.e., the distance from the plane of emission to point 5 in plane H, as being the penetration depth of the jet into the blast.

Still with reference to FIG. 2H, the maximum jet dimension, measured laterally of the blast and in the plane of emission, is indicated at $D_j$, this being in the case of a circular cross section jet, the diameter of the jet orifice 14. All of the flow of the blast which directly intersects the jet, that is the flow within a section as wide as $D_j$ and substantially as high as the depth of penetration P, will become involved in the interaction with the jet. Some of the blast to either side of the jet will also become involved with the interaction, as indicated by various of the flow arrows 18 which curve back and up toward the jet and the tornadoes; beyond a certain limit the blast flow lines are shown as bending slightly outwardly around the zone of interaction, and then bending slightly inwardly again, but not becoming involved in the mixed or the torating flow. In an arrangement such as that of FIG. 2H, the dimension of the portion of the blast indicated at $D_b$, that is the width of the portion of the blast which mixes with the jet, is about 1.5 to 3 times the jet dimension $D_j$ measured laterally of the blast.

In FIG. 2H, blast flow lines are included at five numbered levels, these being shown as emanating from opposite ends of the lines 1-1', 2-2', 3-3' and 4-4' and from the point indicated by number 5, at the point of maximum penetration. The points 1, 2, 3, 4, 5, 4', 3', 2', 1' and 1 are interconnected by a line 6 which frames the section of the blast, shown cross-hatched, which mixes with the jet. The area of the blast enclosed by the line 6, which we refer to as the blast operational area, is approximately equal to the product of $D_b$ and P.

Any flow line of the blast which crosses a point in plane H beyond the section defined by line 6 will not directly take part in the interaction phenomenon, but will only be deflected by it, more or less, according to the distance between said point and line 6 in plane H.

To sum up, the area of the blast taken far enough upstream from the jet so as to be in a region of the blast which is undisturbed by the jet, which includes all of the blast flow that is involved with the jet in forming the zone of interaction, constitutes the operational area $S_b$ of the blast. This area, as explained below, is significant to toration and is hereafter identified as blast section $S_b$.

The corresponding operational area of the jet is the cross sectional area of the jet orifice 14, and is hereafter identified as jet section $S_j$.

Mechanics teaches that a mass $m$ moving with velocity $v$ has a momentum M $$M = mv$$

For a fluid in flow, such as the blast or the jet of the present invention, the mass $m$ can be found from the density $\rho$ and the volume of the fluid which flows during a given unit of time through a given sectional area, such volume being the product of the sectional area S of the flow and the velocity $v$ $$m = S \rho v$$

Substituting for $m$ in the momentum equation gives $$M = S \rho vv = S \rho v^2$$

Since the areas of the blast and the jet which are of importance to toration are the operational areas $S_b$ and $S_j$, as above identified, the momentums of the blast and jet, respectively, can be expressed as follows, using the subscript $b$ to indicate the blast and the subscript $j$ to indicate the jet $$M_b = S_b \rho_b v_b^2$$

and $$M_j = S_j \rho_j v_j^2$$

The factor $\rho v^2$, for either flow, can be referred to by any of the following four expressions used in the fluid dynamics field:

1. Dynamic pressure head
2. Momentum per unit of time and per unit of section
3. Momentum output per unit of section, and
4. Kinetic energy per unit of volume.

We have found that the maximum penetration depth P of the jet into the blast, as above defined, is directly proportional to the dimension $D_j$ of the jet and to the ratio of the kinetic energy per unit of volume of the jet to that of the blast.

Hence, for general operational considerations, the ratios of the blast and jet kinetic energies per unit of volume, can be employed instead of the ratios of the momentums of the blast and jet, independent of the specific operational areas in any given set up of toration equipment. The expression "kinetic energy per unit of volume" of one jet of a pair of intersecting jets relates to the kinetic energy of that portion of the jet which flows through the zone of interaction with the second jet.

In the text that follows we shall therefore refer to the ratio of kinetic energies per unit of volume.

With the foregoing in mind, it will now be understood that for toration to be performed, it is necessary that the kinetic energy per unit of volume of the jet be greater than that of the portion of the blast which flows through the operational area thereof.

Zone D

Zone D is illustrated as commencing upon the end of Zone C but as having no limited dimension in the other direction. This is because Zone D is of indefinite extent in the downstream direction.

In Zone D, by viscous dissipation, the two counterrotating tornadoes progressively lose their identities, angular velocities and energy. The section illustrated in FIG. 2G is taken near the beginning of Zone D and shows how the tornadoes are no longer well defined and are more wavey than in FIG. 2F. They become disorganized and begin to mix with and merge into the larger body of the primary jet or blast, and after a distance of about 3 to 5 secondary jet orifice diameters measured, on the second scale, from the end of Zone C, it can be said that the two jet interaction phenomenon is finished.

While the smoothness, uniformity and homogeneity of the principal blast can never be fully restored after the very substantial disruption effected in Zones A, B, and C, nevertheless at a distance of 3 to 5 secondary jet diameters measured from the commencement of Zone D, the flow of the principal blast is restored enough so that it is the dominant characteristic of the fluid flow in Zone D.

This restoration of the principal blast occurs from about 16 to 18 secondary jet orifice diameters, measured along the second scale, FIG. 2B, which, in the illustration of the invention shown in FIG. 2B, corresponds to about 7 to 10 jet orifice diameters, measured along the first scale. In other words, the jet interaction effect which determines toration takes place within about 7 to 10 jet orifice diameters along the first scale, and it is thus possible to locate another jet at such a downstream distance and repeat toration in the interaction zone established by this downstreaam jet. By repetition it is possible to have a plurality, or even a series, of successive toration fiberizing centers spaced downstream along a single blast.

ZONES OF ACTION ON GLASS

Zone I

Zone I comprises the above mentioned portion of Zone A adjacent the plate 10, that is the portion in which the recirculation currents are the most pronounced. As with Zone A, Zone I extends considerably both in a lateral sense and in an upstream-downstream sense and perpendicularly to the plate a distance of about 1 or 2 secondary jet orifice diameters.

In Zone I the glass is either emitted directly into the low pressure zone immediately downstream of the secondary jet, or is drawn into this zone in situations in which it is supplied some distance from it. The flow of the glass into this region can be relied upon to take place clearly, even if the glass emission orifice in the plate 10 is not located immediately adjacent the downstream side of the secondary jet. This is so because the recirculation currents, discussed above in connection with Zone A, are quite pronounced and strong in Zone I. Stated in another way, in Zone I the glass localizes in the region of negative pressure just downstream of the secondary jet. The localilzation is seen in the section shown in FIG. 2C.

The localization phenomenon is quite important to toration because it contributes significantly to the formation of a highly stable cone of glass from the tip of which attenuation into fine fiber can be effected. The localization provides an extremely reliable and reproducible and predictable base for the stable cone.

Within surprisingly wide limits which will be discussed just below, if molten glass is emitted into the system at a point other than immediately downstream of the secondary of the secondary jet, the glass will nevertheless flow quickly and directly into the region of localization. If the glass is introduced slightly downstream from the orifice position 16 shown in FIG. 2B, the recirculation currents will cause it to flow upstream towards and then against the downstream side of the secondary jet, right into the position in which it is desired.

Further, the glass can be introduced downstream and slightly off to either side of the center line of the secondary jet without having it escape from the recirculation currents. If the glass is introduced anywhere within the zone of reduced, or negative, pressure discussed above in connection with Zone A, it will flow immediately to and localize in the desired position directly downstream of the secondary jet.

If the glass is introduced into the system upstream of the secondary jet, and substantially in line with the center of the secondary jet, it will flow along the plate to the upstream side of the secondary jet where it will sometimes split so that a portion flows around each side of the base of the secondary jet. If it does split, the split streams of glass will flow together immediately downstream of the secondary jet and assume the desired position of localization. If it does not split, it will flow around one side or the other and into the position of localization.

Still further, if the glass is introduced upstream and slightly off to either side of the center line of the secondary jet, it will flow downstream to the base of the secondary jet, will then flow around one side of the base of the secondary jet, and reach the position of localization immediately downstream of the secondary jet.

Of course, if the glass is introduced substantially downstream of the secondary jet, for example four or more secondary jet orifice diameters downstream measured on the first scale, it will not be captured by the recirculation currents. Similarly, if the glass is introduced upstream but too far to one side of the secondary jet, it will flow on past the secondary jet without being captured by the recirculation currents.

However, within significantly wide limits, toration makes available a choice of glass emission points which can be used without impairing the results achieved.

In addition to the above described influence which the flows of the gaseous currents have on the glass in Zone I, there is a surface tension effect, particularly with reference to the region immediately next to the glass orifice, this surface tension effect being contributed to by the surface to surface engagement of the glass with the orifice wall as the glass passes out of the orifice into the plane of emission of the toration system. By locating the glass emission orifices in the zone of localization immediately downstream of the secondary jet, advantage can be taken of the glass surface tension effect, that is, the surface tension is used to contribute to the stability of the glass cone. For this reason we prefer to locate our glass emission orifice means immediately downstream of the secondary jet.

To sum up with respect to the flow of the attenuating material in Zone I, it is characterized by the delivery of this material into the system in the vicinity of the zone interaction, and the localization of the material in a position immediately downstream of the secondary jet.

Zone II

Zone II extends for about 3 secondary jet orifice diameters along the second scale from the end of Zone I for reasons set forth later. In Zone II, the glass, already localized as above described in connection with Zone I, is drawn upwardly under the combined action of the gaseous currents and forms itself into a stable cone. Within the body of the glass, the glass travels out into the cone, essentially by laminar flow, and continuously, uniformly and progressively decreases in cross section as it flows toward the apex of the cone. The steady diminution in cross section is important to the production of a fiber of substantially uniform diameter along its length and insures the continuity of fiberizing.

From inspection of FIG. 2A it can be seen that the diminution in cross section of the glass takes place during, and in phase with, the expansion in the cross section of the two tornadoes, the flow of the glass into the cone occurring within the concavity formed by the tornadoes and the downstream side of the secondary jet. Thus, the glass cone is protected or shielded from the disruptive impact which the blast would have upon it. A resultant is the stability of the flow of the glass which is an important characteristic of toration.

FIG. 2D shows that the cross section of the glass is reduced as compared to FIG. 2C, this being because FIG. 2D is taken further out along the cone.

Next to the plate the tornadoes or whirls are of very small cross section and the frictional surface interaction thereof against the glass is of quite limited extent. At locations progressively farther and farther away from the plate, the tornadoes are progressively larger and larger and have progressively larger surface contact with the glass, the consequence being that the tornadoes have a progressively increasing influence on the glass attenuation.

The behavior of the attenuable material in Zone I, and extending into and substantially, but not quite entirely through Zone II, is remarkably stable in both dimension and motion. The shape, size and position of the surface of the attenuable material, extending all the way from the plate 10 to the base 19B of the tip portion of the cone, remain substantially constant for a particular set of operating parameters. The molten glass within the cone is in constant and steady motion as it flows from the emission orifice in plate 10. But to the eye of an observer the flow of the glass into the cone shape is not visible and the cone portion up as far as about location 19B (see FIG. 2B) appears to be nearly still. Beyond location 19B, the tip of the glass cone flutters, or moves rapidly and constantly, sometimes in the upstream - downstream sense, sometimes from side to side, sometimes rotationally.

The stability of the glass cone is a feature of particular significance to the success of toration since it makes possible continuous fiberization in which fibers of substantially uniform diameter may be continuously produced practically without the formation of slugs, hooks, pellets, or other undesirable imperfections in the finished product.

A highly stable glass cone is established, the height or length of which cone can be varied, through a considerable range, by selection and control of one or more of several operating parameters discussed below, the point here made being that the cone stability is independent of the cone length.

Zone III

What has been described thus far comprises a process for delivering attenuable material in a molten state at a steady reproducible rate, and in a stream of cross section which is continuously and progressively reducing, into a region in which it can be drawn out into a fine fiber. In other words, the description up to this point concerns the supplying of the glass, in a molten state, to a region of high velocity gaseous flow.

Attention is now turned to Zone III, the region wherein the final phase of the attenuating process, i.e., the drawing out of the attenuable material into very fine fibers, takes place. The drawing occurs within a short length of glass flow and Zone III thus extends for only about 3 to 5 jet secondary orifice diameters on the second scale.

Toration is characterized by dramatically dynamic action in Zone III. While we have witnessed the behavior of the glass in Zones I and II, by the naked eye and by means of high speed motion pictures, the experience undergone by the attenuable material in Zone III occurs far too fast to be seen by the naked eye, and even too fast to be clearly captured by motion pictures. We have made extensive studies using motion pictures taken at 4,000, 6,500 and 10,000 frames per second and projected at speeds down to one frame per second. These studies have shown with certainty that from one cone tip there is only one single fiber drawn; but there remains an element of uncertainty as to the exact path of travel of this fiber in Zone III.

For this reason we have set the upper limit of Zone II at the point to which the motion of the glass can be followed with the naked eye.

What has been observed, particularly by means of the high speed motion pictures above mentioned, is a smooth continuously repititious, whipping action which appears to occur in a single plane but which more probably, because of the rotational nature of the whirling or vortical motion in the region of attenuation, actually follows a helical path, the pitch and the amplitude of which are increasing in the flow direction, for at least a substantial part of the time.

A comparison of the fiber yield per unit time per fiberizing center of toration with the fiber yield of the four main prior art techniques discussed above shows that the toration fiber production rate far exceeds the others, being on the order of 10 to 1 for all of the techniques except for the steam blowing of wool, and on the order of 2 to 1 for the steam blowing of wool. Fiber yield rate can be derived from Table I by deducting the percentage of unfiberized or waste material from the orifice pull rates given.

The production of a single fiber from a single cone at such a high orifice pull rate demonstrates that the speed of the fiber in toration is at least 8 to 10 times higher than the speed of either the blast or the jet.

Details respecting the temperatures of the blast and jet are set forth later. For the present it is pointed out that the temperature of the blast surrounding the glass in Zone III must be high enough so that the glass is in softened, attenuable condition in Zone III.

In considering what happens to the attenuable material in Zone III, from the point of emergence from the stable cone to the point downstream where it is collected as a hardened fine fiber, and taking into account the observable whipping action, it is our view that the stream of attenuable material, while still in Zone II, is drawn up into the concavity or envelope formed between the two counter-rotating tornadoes and the secondary jet, being urged into the concavity by the inwardly directed components 15B of the two counter-rotating tornadoes. In the concavity it confronts the relatively high positive pressure of the hereinabove defined fluid shield and is forced through the rapidly rotating peripheral layer of one or the other of the two tornadoes where the material is then subjected to a very high speed spiral motion causing it to be drawn out into a very fine fiber in Zone III.

Just exactly what motion is imparted to the attenuable material is uncertain; however, certain conclusions concerning the phenomena can be made from the information that is available. The very long, virtually indefinitely long, length of the fiber, compared to the very short length of Zone III, leads us to view the drawing out step as though the attenuating material were held at both ends while rapid whipping forces were applied. One end of the attenuating material is held by being fastened to the cone of glass from which it is emerging. The other end would seem to be a free end, but it actually is not since it is fastened to (that is, integral with) the cooled and hardened fiber that has already passed through Zone III and is up ahead of the length of material undergoing attenuation, which cooled and hardened fiber is held and pulled by the friction forces of the flow in Zone D.

It is thus seen that the energy generated by the whipping or whirling of the hardened fiber (see the discussion of Zones IV and V which follows) is reflected back and deployed, or put to work, in the highly efficient drawing step being performed in Zone III. Since the actual drawing out of the fiber takes place over a span extending only a few secondary jet orifice diameters, most of the whip energy is concentrated and expended in this region (Zone III). The residual whip energy causes the tip of the cone to flutter.

Briefly stated, Zone III is characterized by the final fine drawing of the fiber by means of the concentrated deployment of the energy generated in Zones IV and V.

Zone IV

Zone IV, which extends for about 8 to 15 secondary jet orifice diameters on the second scale, comprises the region in which the ahead hardened fiber is carried along while being vigorously and continuously whipped by the forces generated in the tornadoes. The sections shown in FIGS. 2B and 2F illustrate this whipping motion of the glass.

As above mentioned, it is an important characteristic of the invention that the fibers are removed, very early in the process, to a cool zone, in which no further attenuation is possible, and this is what takes place during the transition from Zone III to Zone IV.

Zone V

Zone V extends from the end of Zone IV indefinitely on toward the fiber collection area. By the time the fiber reaches Zone V the tornadoes are weak and almost indistinguishable, as shown in FIG. 2G. From that point on the partially restored blast flow carries the fiber along out of the toration system.

As described in connection with Zone C, the torating flow resulting from the mixing of the two jets is deflected in generally downstream direction. In Zone IV, as this deflection approaches completion, the glass fiber is directed toward the peripheral layers, farther from the plane of glass emission, where it is cooled rapidly. In all of the embodiments of the invention illustrated in the drawings, except for that of FIG. 3, the peripheral layers farther from the plane of the glass emission are cooler than the layers closer to the plane because the torating flow causes the induction of some much cooler ambient air, indicated in FIGS. 3A, 4 and 5 by the curved arrows 12B. In view of the non-availability of cooler ambient air in the embodiment of FIG. 3, the desired rapid cooling of the fiber is accomplished in other ways. For example, the blast can be at a lower temperature and the carrier jet at a higher temperature, with the result that the desired glass temperature during Zone III is maintained by greater reliance on the hotter secondary jet, and the rapid cooling of the fiber beyond Zone III is performed by the cooler blast.

In this connection it is here pointed out that, in all embodiments of the invention which utilize a plurality of fiberizing centers spaced successively downstream along the blast, care must be exercised to ensure that the Zones III and IV of any given downstream fiberizing center are arranged, according to the teachings hereinafter set forth, so as to be at a sufficiently high temperature for fiberizing in Zone III and a sufficiently low temperature for the desired fiber cooling as the fiber passes into Zone IV. This is accomplished in the embodiments of FIGS. 3A and 4 by having any given downstream fiberizing center perform its fiberizing at a distance away from the plane of emission which is less than the corresponding distance for the fiberizing center immediately upstream. Since the flow of the blast closer to the plane of emission is hotter, the arrangement just described makes possible both the desired rapid fiber cooling and the maintenance of adequate blast temperature at plural fiberizing centers spaced successively downstream.

Another means for accomplishing the same objective is shown in FIG. 5 where, on one hand the ratio between the kinetic energies per unit of volume of the jets of the first row and that of the blast, and the thickness of the blast, are such that the final deflection of the mixing flow of the fiber forms an angle, even if only slight, with the wall; and, on the other hand, the kinetic energies per unit of volume of the jets of the successive rows are progressively decreased to maintain a constant ratio between the kinetic energies per unit of volume of the successive jets and of the blast. As a result the final deflection of the mixing flow and of the fibers from the successive rows are practically parallel to the deflection of the first row. As the mixing flow emerges rather rapidly from the core of the blast, a layer of this blast whose thickness is practically constant and whose temperature is high and uniform, stays adjacent to the wall over a distance corresponding to a few successive fiberizing rows. Such an arrangement therefore maintains the passing point from Zone III (uniform high temperature layer) to Zone IV (zone cooled by air induced from beyond this layer) at a distance from the wall which is practically constant for all the successive rows. As a result this arrangement enables achieving practically identical cooling conditions for all the rows.

This arrangement permits the number of successive fiberizing centers to be increased substantially.

The distance from the plane of emission to the commencement of Zone III, where fiberizing is performed, corresponds to the length of the cone, as described in connection with Zones I and II. The length of the glass cone is a function of the following parameters: orifice pull rate, glass cone base diameter, glass viscosity (and accordingly cone temperature), the energy of the recirculation currents, and the ratio of the kinetic energies, per unit of volume, of the jet and blast.

In general, the greater the jet penetration (P in FIG. 2H), the higher the maximum possible orifice pull rate. Since high orifice pull rates are desirable, deeper jet penetration is desirable. It is advantageous, from the standpoint of minimizing fuel consumption, to utilize as much of the thickness T (FIG. 2H) of the blast as is possible. Also, it is preferable to have the torated fiber quickly removed from a relatively hot, to a relatively cool, portion of the torating flow. All of these factors militate toward deep jet penetration.

While, as above noted, the length of the cone can be adjusted to maximize orifice pull rate without impairing cone stability, it is preferred, for most purposes, that the jet not pierce the blast. Therefore, it must be kept in mind that the maximum permissible penetration depth, without having the jet pierce the blast, imposes an upper limit on the cone length which can be selected.

While we have done our best to analyze and explain the steps in toration, it should be understood that the validity of the explanation in no way affects the results which are obtained, it being our intention to advance our theories in an effort to afford the reader a better appreciation of the invention.

In our view, our analysis and explanation can be considered to be confirmed by scientific studies directed toward the fluid dynamics of intersecting jets in the context of jet aircraft, specifically, the effect of cross winds on airplanes in flight (A), and vertical take-off aircraft (B) (C) and (D) even though such studies do not pertain to the field of our invention, and do not relate the fluid dynamics to the problems associated with the fiberization of an attenuable material. The parenthetical better insertions above refer to the articles identified just below.

BIBLIOGRAPHY OF SCIENTIFIC ARTICLES

A. D. Kuchemann & J. Weber - Aerodynamics of Propulsion Chap. 10, pp. 235–247 - McGraw Hill 1953.

B. Raymond D. Vogler - "Surface Pressure Distributions Induced On A Flat Plate By A Cold Air Jet Issuing Perpendicularly From The Plate and Normal to Low-Speed Free-stream Flow" - National Aeronautics & Space Administration Technical Note D-1629, March 1963.

C. H. Werle et al, Office National D'Etudes Et De Recherches Aerospatiales Document No. 64/1859 A and 70/1859 A - June 1965 and January 1966.

D. R. J. Margason et al "The Path of a Jet Directed at Large Angles to a Subsonic Free Stream" - National Aeronautics & Space Administration Technical Note D-4919, November 1968.

The actual results achieved, and the conditions taught herein for accomplishing these results, are the important considerations. Accordingly, hereinafter emphasis is laid on particular operating conditions, apparatus constructed in accordance with the invention, and the results obtained thereby.

FIG. 3A

Turning now to FIG. 3A, therein is disclosed an embodiment of the subject invention having a plurality of fiberizing centers. Therein, the principal jet, or blast, generally depicted by the feathered arrow 12A, is shown as being emitted through an orifice comprising lips 24, which orifice may be part of an internal combustion chamber such as is described in the patent to Battigelli, U.S. Pat. No. 3,544,254 which issued Dec. 1, 1970, and which is assigned to the assignee of the present invention.

The blast is directed along a path against the wall 28. The wall 28 is equipped with a plurality of secondary jet, orifices 32A, 32B and 32C, respectively spaced from each other in an upstream - downstream sense, together with a corresponding number of orifices for emitting attenuable material 33A, 33B and 33C. Although not appearing in FIG. 3A, it is possible to have pluralization of the jets and glass orifices in the lateral, or cross stream, sense as well as in the upstream - downstream sense, and 32A, 32B and 32C may therefore represent lateral rows of jet orifices, rather than representing single orifices. Each of the secondary jets and its associated orifice for emitting attenuable material functions as an independent fiberizing center. Thus, the secondary jet emitted from orifice 32A interacts with the portion of the blast in immediate proximity thereto, giving rise to a localized zone of interaction into which attenuable material from orifice 33A is introduced in a maanner consistent with the explanation offered with respect to the FIG. 2 series of the drawings.

INTRA-AXIAL SPACING RANGE

It has been found that in order for fiberization to proceed effectively at plural fiberizing centers such as are disclosed in connection with FIG. 3A, certain spacing guidelines must be observed. One of the more important considerations concerns the minimization of the intra-axial distance, i.e., the separation, in the upstream - downstream direction, between a secondary jet orifice and the associated orifice for feeding attenuable material. It has been found that best results are obtained when the intra-axial distance does not exeed 1 to 2 times the diameter of the secondary jet orifice.

TRANSVERSE AND UPSTREAM-DOWNSTREAM INTER-AXIAL SPACING RANGE (PART A)

Important spacing guidelines must also be followed with respect to the inter-axial distances between fiberizing centers. There are two different inter-axial distances involved, one of which, the "lateral inter-axial distance," relates to the distance between fiberizing centers in a sense cross-wise to the blast, and the other of which, the "successive interaxial distance," relates to the distance beteen fiberizing centers taken in the upstream - downstream sense. The minimum lateral inter-axial distance between fiberizing centers is on the order of 2 to 3 times the diameter of a secondary jet orifice, while the minimum successive inter-axial distance between fiberizing centers is on the order of 7 to 10 times the diameter of a secondary jet orifice, except for staggered or offset arrangements discussed below.

When plural jets are used, spaced laterally of the blast, the blast dimension $D_b$, discussed above in connection with FIG. 2H, is reduced somewhat, for example to within a range from just slightly greater than the jet dimension laterally of the blast $D_j$, up to about 2 times $D_j$. This is because the blast flow is not as free to expand around a jet when other jets exist on each side thereof. In other words, the blast flow tends to be squeezed or confined as it passes around and engages in the multi-zones of interaction in a multi-jet configuration, and such use of the blast tends to be more efficient than might be predicted.

As discussed above in connection with the explanation of Zone D shown in FIGS. 2 and 2B, the flow of the blast is substantially, though not completely, restored a short distance downstream from a fiberizing center. We have found that the downstream distance, measured along the first scale as seen in FIGS. 2 and 2B, at which the blast is sufficiently restored to be ready to participate in forming another fiberizing center is approximately 7–10 secondary jet orifice diameters. It follows that, in an embodiment such as is shown in FIG. 3A, the successive inter-axial distance should be, as already mentioned, maintained at about no less than 7–10 secondary jet orifice diameters.

As mentioned above in connection with the description of Zone V, in embodiments such as that of FIG. 3A, the blast closer to the plane of emission is hotter and it is therefore desirable to establish the successive points of passage from Zone III to Zone IV, for all the successive fiberizing centers at successively decreasing distances from the plane of emission in order to ensure adequate temperature for fiberizing, this arrangement being further desirable in order to realize the desired cooling conditions for the fibers.

Still further, this arrangement aids in preventing the fibers at the successive centers from tangling with each other because the cone height is progressively less, center by center, in the downstream direction.

The glass cone height can be reduced by varying one, or several, of the already cited parameters, for example, by reducing the orifice pull rate, or by reducing the size of the glass orifice, or by increasing the glass cone temperature, or by decreasing jet penetration depth.

Since the blast is never quite fully restored after the disruption due to a given fiberizing center, and since each fiberizing center necessarily results in the loss of some of the kinetic energy of the blast, we have found that it is advantageous, in equipment such as is shown in FIG. 3A, to use secondary jets of progressively reduced kinetic energies per unit of volume in the successive fiberizing centers, for example, by using jets of progressively reduced velocities. This can be done while maintaining a desired ratio between the kinetic energy per unit of volume of a secondary jet and the kinetic energy per unit of volume of the blast, as the blast speed decreases progressively from the source of the blast in the downstream direction.

In the embodiment of FIG. 3A, the desired ratio of secondary jet kinetic energy to principal jet kinetic energy has been maintained by successively reducing the velocities of the secondary jets at those fiberizing centers more distant from the origin of the blast.

However, the successive reductions in jet velocities tend to result in the production of coarser fibers, a result which is not desirable. Accordingly, in operating an embodiment such as is shown in FIG. 3A, a substantially uniform average fiber diameter from the various fiberizing centers can be obtained by reducing progressively the orifice pull rate, center by center in a downstream direction. This can be done in various ways, such as, by reducing the glass orifice size, or by reducing the temperature of the crucible wall in the vicinity of this orifice.

An effect similar to that described above with reference to FIG. 3A can be achieved by employing downstream jet orifices of successively reduced size as compared with upstream orifices, instead of using jets of different velocities.

Jets of successively reduced size may also be used with glass orifice means in the form of glass slots, as more fully described below in connection with FIGS. 13A and 13B. For example, in an installation such as shown in FIGS. 13A and 13B, having three rows of fiberizing centers, the diameter of the jets in row 106A, i.e., the upstream row, may be 2.4 mm, the diameter of row 106B may be 2.2 mm, and that of row 106C may be 2.0 mm.

The glass orifices of upstream and downstream fiberizing centers may also be similarly graduated in size when jets of different size are used in upstream and downstream fiberizing centers. For example, in an installation having two rows of fiberizing centers the jets of the upstream and downstream centers are 2 mm and 1.5 mm in diameter. The upstream and downstream centers are respectively supplied with glass from glass orifice slots (as in FIGS. 13A and 13B further described hereinafter), the upstream slot being 1.5 mm in width and the downstream slot being 1 mm in width.

When using jet orifices of successively reduced size, as just described, the lengths of the glass cones will be progressively less, in downstream direction, as is illustrated in FIGS. 3, 3A and 4. When utilizing a set up in which both the jet orifices and the glass orifice means are successively reduced in size, the cones will not only be of successively reduced length, but also of successively smaller section.

Since the blast successively steps down in kinetic energy as successive fiberizing centers are passed, the total number of successive fiberizing centers which can be serviced by a given blast is limited by the cumulative resistance offered by the fiberizing centers to the flow of the blast.

FIG. 3

Another means for increasing the number of fiberizing centers is shown in FIG. 3. Therein is disclosed an embodiment of the invention having a principal jet, or blast, generally depicted by the feathered arrow 12A, shown as being emitted through an orifice comprising lips 24, which orifice may be part of an internal combustion chamber. It is here mentioned that the blast for use in the present invention may be such as is described in the aforementioned patent to Battigelli, U.S. Pat. No. 3,544,254.

The embodiment shown in FIG. 3 differs from that of FIG. 3A by the presence of a second wall 26 similar in construction to and facing wall 28. To the extent possible, the same reference numerals are used in FIGS. 3 and 3A.

The blast is constricted to a path defined essentially by the two opposing walls 26 and 28. The walls 26 and 28 are equipped with a plurality of secondary jet orifices 30A, 30B and 30C and 32A, 32B and 32C, respectively spaced from each other in an upstream - downstream sense, together with a corresponding number of orifices for emitting attenuable material 31A, 31B and 31C, and 33A, 33B and 33C. Although not appearing in FIG. 3, it is possible to have pluralization of the jet and glass orifices in the lateral, or cross stream, sense as well as in the upstream - downstream sense, and 30A, 30B, 30C, 32A, 32B and 32C may therefore represent lateral rows of jet orifices, rather than representing single orifices. Each of the secondary jets and its associated orifice for emitting attenuable material functions as an independent fiberizing center. Thus, the secondary jet emitted from an orifice 30A interacts with the portion of the attenuating blast in immediate proximity thereto, giving rise to a localized zone of interaction into which attenuable material from an orifice 31A is introduced in a manner consistent with the explanation offered with respect to the FIG. 2 series of drawings.

It is pointed out that the glass and secondary jet orifices located in walls 26 and 28 may be longitudinally offset (as shown in FIG. 3) instead of directly facing each other, to provide a maximum number of orifices without appreciable interference of one fiberizing center with another.

FIG. 4

As shown in FIG. 4, effective fiberizing and fiber cooling may also be aided by introducing each successive secondary jet at a slightly smaller angle with respect to the blast than the angle of the jet just upstream from it. The successive secondary jet orifices 36A, 36B and 36C are oriented to direct the jets at progressively flatter angles. Notwithstanding the fact that the kinetic energies per unit of volume of the secondary jets can be all the same, their depth of penetration differs for the successive glass orifices 37A, 37B and 37C at the successive fiberizing centers. As a result of the differential orientation, each succeeding zone of interaction is located progressively closer to the surface of the plate 10.

FIG. 5

The embodiment shown in FIG. 5 makes possible the utilization of a greater number of fiberizing centers in the upstream - downstream direction, while maintaining effective fiberizing and fiber cooling. In FIG. 5 the dot and dash line 12C indicates the approximate level, along the blast 12A, at which the end of Zone III of each fiberizing center occurs.

As shown by the blast flow arrows 12d in FIG. 5, in this embodiment the blast is deflected somewhat during the interaction with the jets. In other words, the deflection into downstream direction, as discussed above in connection with various other embodiments, is partly accomplished by deflection of the jets and partly accomplished by deflection of the blast. The main point to be kept in mind is that the jets penetrate deeply into the blast.

INTER-AXIAL SPACING RANGE (PART B) (WITH STAGGERED CENTERS)

As mentioned above, each of the orifices depicted in FIGS. 3, 3A, 4 and 5, may represent only one of a plurality of orifices in a lateral row. Such multi-hole rows are depicted in the FIGS. 13 and 14 series of drawings described more fully hereinafter. In these latter embodiments it is disclosed that the orifices in successive rows may be offset, or out of alignment in the upstream - downstream sense, to provide a greater density of fiberizing centers without concern that an upstream fiberizing center will have diminished the velocity of the blast to such an extent that fiberization cannot proceed at the next succeeding jet. While, as mentioned, the minimum successive inter-axial separation between fiberizing centers is generally 7 to 10 secondary jet orifice diameters, a separation between successive rows which is reduced may be used in arrangements where the succeeding rows of orifices are offset. Thus the separation between one row and the next succeeding and offset row is about 4 to 5 diameters.

Apart from the offsetting just described, a staggering on opposite sides of the blast in the embodiment of FIG. 3 is desirable. Thus, the fiberizing centers emanating from plates 26 and 28 are not directly opposite each other, but are staggered in the direction of flow of the blast, so as to avoid any adverse interference.

FIGS. 6 and 7

Turning now to FIGS. 6 and 7, therein is shown an alternative arrangement for producing fiber in accordance with the principles of the present invention. In this embodiment, the attenuable material 40 is supplied to the surface of the plate 42 in the form of small granules of glass. The glass granules are heated to the molten state by resistively heating the plate 42 by conventional electrical means not shown. After being melted, the glass moves under the influence of the blast 12 emanating from the burner mouth 44, to the downstream side of the jet 14C where the glass collects in the form of a cone 40A.

From the position of localization immediately downstream of the jet, the molten glass is drawn into the zone of interaction of the blast and the jet and is torated in a manner consistent with the explanation of the FIG. 2 series of drawings.

The plate 42 is provided with a cutaway section 42B downstream of the fiberizing point, which is a useful expedient in precluding the possibility that the attenuable material, while still in the molten state, will stick to or become attached to the plate due to the violent whipping action experienced by the fiber.

FIG. 8

Turning now to FIG. 8, therein is disclosed still another alternative arrangement for practicing the present invention in which a secondary jet is fed via a conduit 50 to an orifice 52 and from thence into a primary jet 12 emanating from a burner 54. The secondary jet 14 being emitted from the orifice 52 partially intercepts the principal jet and is totally encompassed thereby, so that the zone of interaction explained above is established.

The attenuable material 56 emerges from the tank 58, via an orifice, as the cone 16 in the zone of interaction established between the principal and secondary jets.

FIGS. 9A-B-C

Turning now to FIGS. 9A, 9B and 9C, therein is disclosed still another apparatus for manufacturing fibers in accordance with the principles of the present invention. The equipment comprises a resistively heated melting crucible 60, which alternatively may comprise a bushing supplied by a forehearth of a conventional glass batch melting furnace.

A stream of attenuable material 62 is emitted from the melting crucible 60 and is shielded by member 63 as it flows to a fiberizing station indicated generally in FIG. 9A as number 64. As seen in the sectional view of FIG. 9B, the stream of attenuable material 62 is fed into a bushing crucible 66 may means of a funnel shaped hopper 67. The crucible 66 is secured in position within the housing 65 by means of a clamping block 68, the latter being in turn rigidly secured to the housing 65 by way of clamping screws 70. The crucible 66 is insulated with respect to the housing 65 by means of an asbestos packing material 72. Although asbestos is used because of its very high insulating characteristics, other materials including refractory material may be substituted therefor.

Leading from the base of the crucible 66 to the base of the housing 65 are a plurality of narrow conduits terminating in orifices 74, each having an internal diameter on the order of 2mm. These conduits serve to supply attenuable material to the immediately downstream side of a like number of secondary jets, emanating from orifices 76, where the material can be drawn into the zone of interaction of the secondary and primary jets in the manner outlined above with respect to the FIG. 2 series of drawings.

The carrier jet orifices 76 are supplied with heated air under pressure, or products of combustion, from the chamber 78, which in turn is supplied, via tube 80, from the jet generator 82 shown in FIG. 9A.

As is noted particularly with respect to FIG. 9C, there are nine glass orifices 74 in the crucible 66, these being positioned immediately adjacent a like number of carrier jet orifices 76. As discussed above in connection with Zone I, some slight misalignment of a given glass orifice with respect to its associated carrier jet orifice will not substantially impair fiberization because of the localization of the glass in the low pressure region immediately downstream from the jet. However, such misalignment is disadvantageous in the multiple-hole-per-row embodiments in which precise lateral spacing between fiberizing centers is desirable, and because a slight difference in the lateral inter-axial distance separating adjacent carrier jets or attenuable material orifices may be compounded over the multiple fiberizing stations.

If misalignment becomes too great, it may result in a failure of the attenuable material to localize behind the carrier jet at a particular fiberizing center. As a consequence, the attenuable material may leave its orifice in a manner similar to that portrayed in FIG. 1A.

Misalignments may be the result of poor assembly techniques, or machinings, in the preparation of the crucible 66 and chamber 78, but can also be caused by temperature differences.

Temperature differences may contribute to misalignment in several ways. In settling up the design of equipment generally in accordance with the embodiment of FIGS. 9A, 9B and 9C, it is frequently desirable to establish substantially the same target temperature for the operation of the glass crucible 66 and the jet chamber 78. Such design would dictate certain hole spacings for the holes in the crucible and for the holes in the chamber, depending on the materials from which the crucible and chamber are constructed, so that, under the intended operating conditions, the holes in the crucible and chamber would be exactly aligned with each other. However, if the same equipment is used under different operating conditions, thermal expansion to a degree not accounted for in the design could cause misalignment. Further, operating equipment of such design under conditions such that the crucible and the chamber are at significantly different temperatures, could again, because of differential thermal expansion, cause misalignment.

Still further, misalignment may be caused by non-uniform temperature along the length of the row of holes in the crucible, or along the length of the row of holes in the chamber, or both.

FIGS. 12 and 12A (Part A)

A means to avoid the consequences of a misalignment between the secondary jet orifices and the glass orifices is shown in FIGS. 12 and 12A in which the row of glass orifices is replaced by a continuous slot located immediately downstream of the secondary jet orifices. The longitudinal axis of the slot is coincident with what would be the transverse center line of a row of glass orifices, if such a row were to be used.

We have observed that in such an embodiment, contrary to what might be expected, no glass sheet emerges from the slot. Instead the glass is divided into a series of cones, with one cone located exactly downstream of each secondary jet. The bases of these cones are linked together by a continuous surface of glass, shown in FIG. 12A which surface is slightly curved in direction opposite to the projecting cones.

This surprising phenomenon is mainly due to the distribution of pressures along a line parallel to the bottom of the crucible 103 and perpendicular to the blast and located immediately downstream of the row of secondary jets. Along this line, pronounced negative pressure zones develop downstream of each secondary jet and in between these negative pressure zones, there is the dynamic pressure of the blast flowing between the secondary jets. The described pressure distribution forces the glass to flow into the negative pressure zones. The glass surface tension reinforces and stabilizes the hereabove described effect, and thus contributes to the surprising phenomenon. Accordingly, the slot achieves a self-centering of the emission points of the glass.

In an embodiment as disclosed in FIGS. 9A, 9B, and 9C, the bushing crucible 66 may be constructed of steel, but even if special stainless steels having the best available high temperature properties are used, crucibles made of this material have a limited temperature tolerance on the order of 1100°C. At temperatures above about 1100°C warpage may be introduced into the surfaces of the steel crucible, disrupting the sensitive alignment of the secondary jets and the glass supply orifices. There would thus be an effective upper limit on the temperature at which the attenuable material may be introduced into the fiberizing zone.

When torating glass, better operating conditions, particularly higher pull rates, and better fiber characteristics can be achieved when the temperature of the glass contained in the crucible, and consequently the temperature of the crucible itself, are higher than the previously indicated limit of 1100°C.

GLASS TEMPERATURES (PART A) GLASS COMPOSITION (PART A)

There are two parameters influencing the flow of the attenuable material through the orifices as well as the attenuation, and certain fiber characteristics, these two parameters being the material temperature, or the material formula, or both simultaneously.

As a first example, glass output through an orifice increases when the glass viscosity decreases; but the viscosity decreases when the temperature increases and for a given temperature, depends on the glass formula.

As a result, some glasses are called "soft", meaning that their viscosity is low, and others are called "hard" because, when at the same temperature as the soft ones their viscosity is much higher. Generally speaking, hard glasses are less expensive than soft glasses.

A second example of the influence of the attenuable material temperature is in relation to glass devitrification, which is the phenomenon by which glass crystals appear spontaneously in a glass mass in a molten state. The growth velocity of these crystals depends on the glass temperature and formula. There is a temperature above which all the crystals are melted and this upper temperature of devitrification is called the glass "liquidus."

When numerous enough, the devitrification crystals tend to block up the orifices through which glass is flowing. Accordingly, it is important to work at a temperature higher than the upper temperature of devitrification, or liquidus, that is to say, at high temperatures.

A third example is in connection with fiber resistance to high temperatures. This resistance is essentially a function of the glass formula.

Generally speaking, fiber resistance to high temperatures, viscosity, and liquidus, vary in the same direction when changing the formula and increase when going from soft glasses to hard glasses.

As another example of the influence of the attenuable material temperature, the specific calorific consumption of the jets, which can be measured in kilocalories per kilogram of fiberized glass, is also dependent upon the glass formula and the temperature at which the glass is introduced into the torating zone.

Thus, for a given attenuating energy, the lower the glass viscosity in the attenuating zone, that is, the higher the glass temperature, the more effective is the glass attenuation.

High temperature is imparted to the glass partly in the crucible, and partly in the torating zone by the high temperature of the torating flow in Zones I, II and III. Accordingly, to minimize the specific calorific consumption of the jets, it is desirable to arrange for a flow of glass at very high temperature at the glass orifice discharge.

Consequently to utilize hard glasses, to get high orifice pull rates, to prevent blockages of glass orifices, and to minimize the specific calorific consumption of the jets, it is highly advantageous to maintain the attenuable material in the crucible at temperatures higher than the limit temperature of the crucible hereabove mentioned in connection with embodiments, such as are illustrated in FIGS. 9A, 9B and 9C, when steel is used for the crucible.

For this reason, we prefer to use materials which are resistant to very high temperatures, such as platinum alloys, or refractory oxides, in the construction of the jet chamber and the glass crucible.

The following is an example of a hard glass formula which can be fiberized according to the present invention.

| | |
|---|---|
| $SiO_2$ | 46.00% |
| $Al_2O_3$ | 9.00% |
| $Fe_2O_3$ | 1.20% |
| $FeO$ | 0.40% |
| $CaO$ | 32.00% |
| $MgO$ | 3.50% |
| $K_2O$ | 2.90% |
| $Na_2O$ | 5.00% |

GLASS ORIFICE SIZE

In general, the hotter the glass temperature selected, the lower the viscosity of the molten glass, and the smaller will be the orifice through which such glass will pass. However, the high temperature strength of the material from which the glass crucible is constructed will indicate practical upper limits to the temperature of the glass which can be employed. There is thus, in turn, a minimum orifice size through which the glass will pass when at a temperature not so high as to cause the glass crucible to fail. We have found that good conditions for toration can be established with glass orifice sizes in the range of from about 1 to about 3 mm.

In the embodiments of the present invention having multiple laterally spaced fiberizing centers, including the embodiment of FIGS. 9A, 9B and 9C, some difficulty has been experienced with respect to fiberizing at centers at the extreme ends of a row. The fibers produced from end orifices tend to stick to parts of the fiberizing equipment. Although it is possible to improve the quality of the fibers being produced at the end holes by adjusting the relative velocities of the carrier jets and the blast, this usually results in a deterioration of the quality of the fibers produced at the other fiberizing centers, i.e., at those central of the end holes. In order to correct this problem, we have found that it is of advantage to provide one or more extra jet orifices at each end of the row. This teaching is specifically disclosed in the embodiment of FIG. 12, to be discussed herebelow.

The provision of supplemental, or extra, jets at the ends of the rows has the effect of establishing a symmetrical pattern of flow, because, with the extra holes in operation, each of the carrier jets which has a glass hole to pull on has a jet blowing out on both sides of itself.

GLASS TEMPERATURES (PART B)

As mentioned above, the temperature of the glass, for some glass compositions, is preferably maintained above 1250°C; however, in the embodiment of the invention described above with reference to FIGS. 9A, 9B and 9C, if a stainless steel crucible and chamber are used, an upper glass temperature limit of 1100°C is imposed by the stainless steel. The stream of glass 62 flows from the melting crucible 60 at a temperature of approximately 1260°C, but, in transit, loses heat so that it is on the order of 1070°C by the time it reaches the bushing crucible 66. The temperature of the glass in the crucible 66 is maintained at the desired value by means of a crucible heater and an electric transformer, identified in FIG. 9A as member 84, supplying energy to the crucible 66 by way of the bus bars 86. In addition to heating the attenuable material inside the crucible 66, the heat generated by transformer 84 is also effective in maintaining the temperature of the carrier jet, from the generator 82, at a value which is optimum for fiberizing purposes. In some cases the temperature of the pressurized fluid resulting from the generator 82 may have to be reduced. In such event, the heated fluid in tube 80 may be diluted with cold compressed air, or alternatively a simple form of heat transfer mechanism (not shown), such as a fluid circulator, may be positioned in heat transfer relationship with the tube 80 to reduce the temperature of the secondary jet to the desired level.

The burner 88 in FIG. 9A serves as means for establishing the principal blast. The burner 88 is shown oriented so that the flow of the output gases therefrom is parallel to, and sweeping against, the under surface of member 64. The burner 88 may be mounted so that it can be raised or lowered slightly, and also tilted slightly, up or down, for example about 3°, to vary the position and angle at which the blast is projected toward the plate. We have found that the burner 88 is preferably oriented so that the gases are emitted parallel to the plate and sweeping against it, but may also advantageously be tilted so that the hot gases from the burner are directed slightly toward, and therefore forcefully lick, the under surface of the assembly composed of the chamber 78, the crucible 66 and the housing 65, all three of which are preferably arranged so that their bottom surfaces are aligned to, in effect, constitute a plane or plate.

Orienting the burner 88 at the undersurface of the housing 65 enables the controlled transfer of heat energy thereto which serves to raise the temperature of the crucible 66 and chamber 78. An alternative manner of effecting heat transfer to the underside of the housing 65, and thence to the crucible 66 and chamber 78, is to raise the upper lip of the burner 88 slightly above the level of the bottom of housing 65 so that a portion of the blast is played directly against the housing 65. In effecting heat transfer to the crucible and chamber via the latter method, care must be exercised to see that there is no undesirable disruption to the pattern of fluid flow around the orifices 74 and 76. We have found that good results are obtained when the burner 88 is not raised at all, or, when raised, that the upper lip of the burner 88 is raised only by an amount not exceeding 1.5 mm above the position at which no blast impinges directly upon the sidewall of the housing 65.

The physical parameters defining the mouthpiece of the burner 88 are important to the practice of the present invention in that the lips of the burner must be as close as possible to the plane of emission of the secondary jet and the attenuable material, and the same time the separation between the upper and lower lip must be sufficiently wide to insure that the cone of attenuable material will be totally enveloped by the torating flow.

An additional consideration concerns the desirability of minimizing the consumption of heat energy, and thus of fuel, in the performance of the process, and an advantageous way of achieving this is by adjusting the width of the slot between the burner lips to the minimum possible while still achieving the above results. An additional consideration respecting heat consumption is the spacing of the fiberizing center from the lips of the burner. From the standpoint of conservation of heat, the closer the lips are to the fiberizing center, the better the result because there is reduced opportunity for heat loss by convection, radiation and conduction. However, the lips of the burner cannot be right against the fiberizing center because there would then be a risk that there would be disruptive eddy currents which would interfere with the process. We have found that good results are obtained when this distance is quite small, for example, below about 25 mm, and preferably below about 10 to 15 mm.

Chute 90 in FIG. 9A is a hollow member, conveniently of rectangular cross-section, which guides the torated fibers to a conveyor system (not shown) where they may be collected, arranged and moved to a packing or further processing station.

It will be noted that the section line 9B, as shown on FIG. 9C, is taken in a position such that the hot air supply tube 80 is not visible in FIG. 9B. However, for the sake of clarity of presentation, tube 80 is indicated in FIG. 9B in dot and dash lines.

The whipping action of the fibers, as fully described in connection with the above discussion of the zones of toration, sometimes causes a fiber to touch against various parts of the equipment, particularly the plate through which the attenuable material is emitted and especially in the region thereof downstream of the fiberizing center. If the equipment so touched by the fiber is hot, there may be a tendency for the fiber to stick, in which case a length of fiber may melt and drop into the product as a piece of unfiberized material.

Certain provisions for minimizing such risk of the sticking of fibers, and also for avoiding undesirable cooling of the bottom of the crucible, are illustrated in FIGS. 10 and 11, which show alternative embodiments also incorporating still other features, as will be seen from the following.

FIG. 10

The arrangement of FIG. 10 includes a downstream metal plate 92 having a cooling tube 94 mounted in heat transfer relation to the plate in order to provide for circulation of a cooling liquid 96. The plate 92 is advantageously formed of a metal having good heat conduction characteristics, for instance copper. With this arrangement, even if the whipping action of the fibers being formed brings the fibers into contact with the surface 92, the fibers will not have a tendency to stick and build up because of the fact that the surface is cooled. An arrangement of this kind aids in avoiding possible accumulation of fibers on the surface of the equipment.

With further reference to FIG. 10, the burner lips are indicated at 44, and a carrier jet chamber is indicated at 78, the glass crucible being shown at 66 as in FIGS. 9A, 9B and 9C. However, in FIG. 10 an asbestos board 72A is applied to the crucible 66 in a position to aid in minimizing heat loss, thereby maintaining the desired crucible and glass temperature especially in the region of feed of the glass to the glass supply orifice. Such an insulating shield may be employed in a position more or less directly exposed to the blast, but in installations having a blast defining wall element or surface which is cooled, such as the downstream plate 92, the plate is interposed between the gaseous flow and the shielded crucible.

The plate 92, however, is extended in the upstream direction to a point relatively close to the glass supply port, and in order to avoid excessive cooling of the glass adjacent to the discharge orifice, a protective shield of mica indicated at 98 may be introduced. The plate 92 may be oriented, with respect to the plane of the bottom wall 79 of chamber 78, that is, the plane of emission, at a slight angle, as shown. We have found that an angle of between about 3° and about 20° is appropriate, and we prefer an angle in the lower end of this range.

FIG. 11

A similar arrangement of components is shown in FIG. 11, but in FIG. 11 there is further illustrated a lower deflector 100 arranged at the side of the blast opposite to the fiberizing center and preferably curved downwardly in the region opposite to the fiberizing center. This deflector 100 is also desirably provided with pipes 94 in heat exchange relation to the deflector and serving to carry a coolant 96 so that in the event that the whipping action of the fiber causes it to touch the deflector 100, the fiber will not stick to the surface of the deflector.

With respect to the wall elements 92 and 100, it is to be noted that these elements aid in deflecting the flow of gases, particularly downstream of the fiberizing center, and this aids in stabilizing toration, as well as in reducing the risk of the fibers adhering to the surfaces of the equipment.

A noticeable difference in the posture of the cone of attenuable material is observed, particularly when the lower deflector 100 is employed. In the latter case, the tip of the cone of attenuable material appears to project more directly into the core of the blast.

The downstream plate 92 and the lower deflector 100 constitute effective means for guiding and stabilizing the flow resulting from the interaction of the two jets, more or less independently of the velocities of the jets, which makes possible the production of a fiber of highly constant quality. In other words, the downstream plate 92 and deflector 100 constitute means for broadening the range of conditions under which successful operations can be performed for favorably influencing the quality of the fibers produced, although it is pointed out that other embodiments of the equipment are also capable of producing high quality fibers, without the use of such plates or deflectors.

Multiple fiberizing centers are desirably provided in order to maximize production with given equipment and one arrangement for achieving the multiplication of the fiberizing centers is to provide one or more series of fiberizing centers spaced from each other in a zone extended transversely or laterally of the blast.

FIGS. 12 AND 12A (PART B)

Another system for achieving the lateral or transverse multiplication of the fiberizing centers is illustrated in FIGS. 12 and 12A. Note that in FIG. 12A the right hand three jets are indicated as extending downwardly a considerable distance whereas the other jets are shown as being quite short. This is for reasons of simplicity and clarity only. In actual practice all of the jets would be substantially as shown in the FIG. 2 series of drawings.

In FIG. 12 the equipment is arranged so that there is virtually no plate, or at least a plate of quite limited dimension, and the influence of the plate is therefore quite small.

In this arrangement a crucible 103 is provided with a glass orifice in the form of a slot 104 which is elongated transversely of the blast. Upstream of the slot a manifold or chamber 106 is provided, having a transverse series of carrier jet orifices 106D positioned close to the slot 104, the manifold being provided with one or more connections such as indicated at 75 for supplying the jet fluid.

As herein above mentioned, in the arrangements of FIGS. 12 and 12A the several jets delivered from the orifices establish the fiberizing centers as a result of the localized influence of each jet upon the molten glass at the lips of the slot 104. In consequence of this action, instead of discharging a continuous sheet or curtain of glass, the glass discharging from the orifice slot is localized in zones immediately downstream of each of the carrier jets, thereby providing individual glass cones which, in cooperation with the individual carrier jets constitute individual fiberizing centers. This effect is clearly indicated in FIG. 12A, but it also occurs in the operation of the equipment of FIG. 12.

As seen in FIG. 12 it is desirable that the series of jet orifices 106D include at least one jet orifice located beyond each end of the slot 104, this being of importance in order to avoid deleterious end effects, as described above.

In a typical arrangement employing a glass orifice in the form of a slot, the width of the slot may desirably be about the same as the disclosed jet orifice diameter, that is about 1 to 3 mm, this dimension being a function of the viscosity of the attenuable material under normal fiberizing conditions.

An advantage of using a slot for the emission of the glass is to avoid the consequences of a misalignment of the glass orifices and secondary jet orifices, as mentioned above.

Still another advantage in using a slot is that it provides self regulation of glass pull rate and attenuation for each cone. We have found that glass pull rate is proportional to the width of the slot and to the secondary jet diameter, provided said slot width does not exceed the length of the recirculation zone, measured in downstream direction from the secondary jet. As already stated such length of the recirculation zone is proportional to the secondary jet orifice diameter and to the ratio between the kinetic energies of the blast and of the jet. Additionally, the jet speeds must be high enough to attenuate the amount of glass pulled.

When the characteristics of one transversal row of secondary jets are uniform, i.e., when orifice diameters, jet velocities and temperatures are the same, glass pull rates will also be uniform, each fiberizing center attenuating the same amount of glass.

When the characteristics of the jets along a given lateral row of jets differ, particularly jet hole diameter, pull rates will automatically adjust to the actual conditions.

For large scale operation it is important to provide for simultaneous operation of a large number of fiberizing centers. Further, the density of the fiberizing centers should also be high in order to maximize the ratio of the amount of fibers produced to the amount of energy used and to decrease investment cost by reducing the number of manufacturing units.

FIGS. 13A-B

One embodiment of equipment adapted to achieve the above objectives is illustrated in FIGS. 13A and 13B. In FIG. 13A the blast is indicated as being confined between walls, including a plate 92 and a curved deflector surface 100, which may be of construction as described above in connection with FIGS. 10 and 11.

The embodiment of FIGS. 13A and 13B includes a crucible 103 which is substantially enlarged as compared with certain of the preceding embodiments and which is provided with glass delivery slots 104A, 104B and 104C. Multi-orificed jet supply chambers 106A, 106B and 106C are positioned within the crucible 103 and each of these chambers is provided with a series of orifices to provide carrier jets close to but upstream of the glass supply slots. As seen in FIG. 13B the carrier jet orifices of each of the supply chambers 106A, 106B and 106C are staggered upstream and downstream of the blast, in order to minimize interference between fiberizing centers.

It is also contemplated in the embodiment of FIGS. 13A and 13B that the transverse series of carrier jet orifices include at least one orifice supplying a jet at each end beyond the glass feed slot, in order to provide for uniformity of operation of all of the active carrier jets in each series. The embodiment of FIGS. 13A and 13B is still further characterized by a set up which is advantageous in at least certain operations in which it is desired to establish a carrier jet temperature very close to the temperature of the molten glass. The disposition of the jet supply chambers within the crucible assists in equalizing the jet and the glass temperatures.

INTER-AXIAL SPACING RANGE (PART C) VELOCITY AND ENERGY OF BLAST AND JET (PART B)

In addition to the general operating conditions applicable to the successful toration of a fiber from a single fiberization center, various general rules must be observed when torating in a system containing multiple rows, each row in turn containing plural fiberizing centers. In this respect, and expanding on the generalized rules outlined above, it is desirable that the inter-axial separation between adjacent fiberizing centers arranged in a series transversely of the direction of flow of the blast should be on the order of at least 2 or 3 secondary jet orifice diameters, while the inter-axial separation between adjacent fiberizing centers lying along the longitudinal axis of flow of the blast must be on the order of at least 7 to 10 secondary jet orifice diameters. The number of rows of fiberizing centers which may successfully be served by a single blast is determined by the residual energy of the blast at the most remote fiberizing center, i.e., that positioned furtherest downstream from the source of the blast. It is desirable to maintain a ratio between the velocity, or kinetic energy per unit of volume, of the carrier jet and that of the operational area of the blast which is constant for each of the fiberizing centers. It is possible to utilize a broad range of velocity values for both the primary and secondary jets, but is is necessary to provide a secondary jet of kinetic energy per unit of volume greater than the kinetic energy per unit of volume of the primary jet. The overall range of ratios of secondary jet to primary jet kinetic energies, per unit of volume, is from slightly greater than unity up to about 40 to 1, and we prefer a ratio between 4 to 1 and 25 to 1.

In maintaining the desired interaction of the secondary jet and the primary jet it has already been noted that it is possible to vary either the velocity or the angle of orientation of the secondary jet with respect to the blast. The angle of the carrier jet relative to the blast or to the plane of emission of the jet may be varied over a considerable range from the perpendicular position. For example, the carrier jet may be directed into the blast at an angle inclined upstream of the blast, for instance, up to about 45° from the perpendicular position; and the angle of the carrier jet may also be inclined downstream of the blast, for instance, through a range of about 45° from the perpendicular position. Preferably the carrier jet is either positioned so as to enter the blast in a path which is substantially perpendicular to the direction of the blast, or is inclined somewhat downstream of the blast, the latter inclination being particularly desirable for the downstream fiberizing centers where multiple fiberizing centers are located upstream and downstream with respect to each other, as in FIG. 4.

With respect to the size of the carrier jet orifice, we prefer to use carrier jets of about the same size as heretofore stated with respect to glass orifice sizes, that is, about 1 to 3 mm.

ANGLE OF JET TO BLAST

The glass may be emitted from a glass orifice by delivery through a passage extended at any of a wide range of angles upstream of the orifice, this factor not being of importance since the forces of the interaction of the carrier jet and blast are the controlling forces, the glass having been delivered from the orifice without any substantial kinetic energy.

INTER-AXIAL SPACING RANGE (PART D)

Additional control may be exercised over the results obtained by varying the rate of flow of the blast. Further, by staggering the orifices in succesive rows, it is possible to increase the density of fiberization centers to bring the minimum inter-axial separation between successive rows down to something on the order of 5 secondary jet orifice diameters.

Since appreciable amounts of energy are extracted from the blast at each row of fiberizing centers, the residual energy available to succeeding rows of fiberizing centers is diminished proportionally. It follows that there exists an upper limit to the number of rows of fiberizing centers which may effectively be located downstream of one another. With presently available equipment being operated with glass, the upper limit would appear to be on the order of 4 to 5 rows of fiberizing centers located successively downstream of one another.

Still another embodiment of equipment having a high density of fiberizing centers is disclosed in detail in FIGS. 14A through 14D. As seen in these Figures, the crucible is a structure of a generally rectangular configuration having a smooth and flat bottom wall or plate 10A presented to the blast, the latter being indicated by the feathered arrow 12A. Three rows of paired carrier jets and orifices for emitting attenuable material are distributed over the surface of the plate 10A preferably in accordance with the rules governing intra ind inter-axial separation set out above.

FIGS. 14A-D

The structure of FIGS. 14A to 14D has an upper and a lower portion, the lower portion in turn serving as a feeding stage 110, comprising that portion of the crucible located below the line 111. The feeding stage 110 has channels 112A, 112B, and 112C and 114A, 114B, and 114C. The channels 112A, 112B, and 112C serve to supply attenuable material to the plate area 10A by way of the orifices indicated at 116A, 116B, and 116C in FIG. 14B. Similarly, channels 114A, 114B, and 114C serve to convey fluid under pressure to the plate area 10A by means of the orifices 118A, 118B, and 118C of FIG. 14B.

The upper portion of the crucible, namely, that portion lying above the line 111, comprises the supply portion. The supply portion accommodates the incoming fluids, i.e., the bulk form of the secondary jet and the attenuable material. As indicated particularly in FIGS. 14C and 14D taken along the section lines 14C and 14D respectively of FIG. 14A, the pressurized fluid comprising the secondary jet enters the upper portion of the structure via either or both of the tubes 120A and 120B, where after passing through chambers 112A and 112B it flows as indicated by the arrows into the channels 114A, 114B, and 114C via slots 124A, 124B, and 124C and 126A, 126B, and 126C. The jet fluid is then discharged through the several jet orifices 118A, 118B and 118C.

The attenuable material is fed into the housing 110 in the form of a small stream shielded by a tube 128 and after accumulating in the chamber 130 it distributes itself within the channels 112A, 112B and 112C.

At either end of the housing 110 there are located solid metallic members 132A and 132B, which serve both as clamps for positioning the crucible in the desired relationship with respect to the blast and also as electrical contacts for establishing electrical connection with an appropriate electrical energy source (not shown), the latter serving to resistively heat the crucible so as to raise or maintain the temperature of the secondary jet and attenuable material at a desired value.

In the embodiment of FIGS. 14A to 14D it is contemplated that the glass will be melted in some furnace and then delivered in a stream through the tube 128, the rate of delivery being sufficient to provide a level of glass somewhat above the level indicated at 111 in order to assure that the channels 112A, 112B and 112C will remain full and thus provide for adequate supply to the glass emission orifices 116A, 116B and 116C.

FIGS. 15A-D

Turning now to the embodiment illustrated in FIGS. 15A to 15d, it is first pointed out that this embodiment is adapted to operate in conjunction with a glass composition melting furnace of any desired known type, from which the molten glass is fed through a forehearth to the points of use.

In the plan view of FIG. 15B, a portion of a forehearth is indicated at 134, and this forehearth is provided with forehearth branches or channels 136, 138 and 140, these branches also being shown in FIG. 15A.

Along each forehearth branch a plurality of glass tapping stations are provided, 10 being shown in each branch in FIG. 15B, being respectively identified as stations A to J inclusive. At each one of these tapping stations along each one of the forehearth branches, equipment is arranged in order to provide a multiplicity of fiberizing centers to be fed with glass from each tapping station.

Equipment arranged at each tapping station includes a glass crucible, the crucible for the forehearth branch 136 being indicated at 142 in FIGS. 15A and 15B and being shown in enlarged elevation and section, respectively, in FIGS. 15C and 15D. A similar series of crucibles 144 are provided for the tapping stations associated with forehearth branch 138, and a similar series of crucibles 146 is likewise associated with the forehearth branch 140. Each crucible 142, 144 and 146 is provided with discharge passage means indicated at 164 in FIG. 15D and providing either a series of individual glass discharge orifices or alternatively a slot such as described above with reference to FIGS. 12 and 12A.

The number of fiberizing centers which can be provided, side by side, along a given crucible can vary within wide limits. In general, good results can be achieved, and a high rate of combined production attained, with up to about 100 fiberizing centers.

At each fiberizing center associated with each tapping station along each of the three forehearth branches, a mechanism indicated at 154, 156 or 158 is provided for developing the primary jet or blast and, as seen in FIGS. 15C and 15D, this mechanism is provided with lips 44 for directing the blast in a generally horizontal direction past the glass orifice means 164.

At each tapping station there is further provided a means for developing the secondary jet, these means being indicated at 148, 150 and 152 in FIG. 15A, there being one such means for each tapping station.

In FIG. 15B the full showing of the jet devices 148, 150 and 152 has been omitted for the sake of clarity and in order to show the blast devices 154, 156 and 158 which lie beneath the jet devices. However in FIG. 15B the point of delivery of the carrier jets has been indicated at 148, 150 and 152.

Turning again to FIGS. 15C and 15D, it will be seen that each of the devices 148 has a delivery or supply pipe 56 extending to a manifold 56A having a group of jet discharge nozzles 162 positioned between the glass supply means 164 and the lips 44 of the blast generator. It will be understood that the series of nozzles 162 is arranged in side-by-side relation extended transversely of the blast 12A, the blast nozzles 162 having orifices located just upstream of the glass supply means 164.

In the pattern of the equipment as shown in FIGS. 15A and 15B, it will be understood that the blasts provided at the several tapping stations are established in directions extending transverse to the forehearth branches, i.e., to the right as viewed in FIGS. 15A and 15B. In consequence of the interaction of the jets with the several blasts at the fiberizing centers, the fibers produced have a tendency to leave the fiberizing area in a direction inclined somewhat downwardly from the mean plane of the fiberizing stations, so that the fibers produced at the tapping stations associated with the forehearth branch 136 may readily be guided as by the inclined hollow guide 168 below the stream of fibers produced at the tapping stations along the forehearth branch 138. These latter fibers are guided through the hollow guide 170 which, in turn, is positioned in large part beneath the similar hollow guide 172 provided for the fibers produced at the tapping stations along the forehearth branch 140. The hollow guides are conveniently made in the form of a duct, with closed sides and of a section which changes along the length so that it is of size appropriate to cooperate with the plural fiberizing centers at one end, and with the collecting conveyor at the other end.

The several hollow guides 168, 170 and 172 have their discharge ends positioned in a region near one end of a fiber or fiber blanket conveyor or collector indicated at 180 which may be of known type comprising a perforate conveyor belt with a suction means arranged between the top and bottom runs of the conveyor, in order to assist collection of the fibers upon the conveyor.

As shown in FIGS. 15A and 15B, the fiber ply developed from each of the forehearth branches may be supplied with a binder, for instance, a thermosetting binder supplied to both the top and bottom surfaces of the ply, by spray devices indicated at 174, 176 and 178. The fact that the total blanket being laid up on the conveyor 180 is made up of several plies, each of which is separately produced and can therefore be separately impregnated with binder, provides for highly effective distribution of the binder throughout the thickness of the total blanket and, in effect, provides for union of the plies together after they are superimposed upon each other on the conveyor. It will be understood that if a thermosetting binder is employed, the blanket may be delivered from the conveyor 180 through or past any suitable heating means, such as an oven, for the purpose of curing or setting the binder. The system of FIGS. 15A to 15D affords a capability of large scale production of fibers by toration particularly because of the high density of fiberizing centers provided.

BLAST AND JET TEMPERATURES

In an installation such as shown in FIGS. 15A to 15D, both the carrier jet generates 148, 150 and 152, and the blast generators 154, 156 and 158 may comprise internal combustion chambers of similar design, each being rated to provide a combustion purposes up to about 1900°C, although for most pruposes the temperature used may be substantially below the maximum of the burners. This is particularly so with respect to the carrier jet generator where the temperature range is ordinarily between 600°C and 1100°C for equipment embodying a stainless steel bushing crucible and jet chamber arrangement. A range from room temperature up to about 1500°C is appropriate for platinum crucibles and jet chambers. Even up to about 1900°C may be used for refractory (e.g., sintered magnesium oxide) equipment. For the primary jet, when the attenuable material is glass, we prefer to operate at temperatures of from about 1250°C to about 1650°C.

BLAST AND JET VELOCITIES AND PRESSURES

The burners are desirably capable of producing a sustained output having a velocity of up to 800m per second, although for most purposes the velocity is between about 500m and 600m per second for the carrier jet, and between about 150m to 400m per second for the blast.

Although having a practical upper limit of 4 bars of pressure, the general range of pressure values for the carrier jet is between 1 and 2.4 bars. Similarly, the upper limit of the dynamic pressure for the burner blast is about 200cm of water, while the optimum range is between 10cm and 100cm of water at a blast orifice lip separation of 6mm to 10mm.

In most embodiments of the present invention it is preferred that the distance separating the outer lip of the blast burner and the axis of the closest carrier jet is on the order of 6mm to 15mm. The separation between the downstream edge of the carrier jet orifice and the upstream edge of the orifice supplying the attenuable material is preferably on the order of 0mm to 0.5mm.

In comparing the production capacity of the facility depicted in FIGS. 15A through 15D, it should be noted that orifice pull rates of 20 kg to 25 kg per fiberizing center per day of fibers having an average diameter of, for example, 6 microns, is possible.

FIBER SIZES AND CHARACTERISTICS

Attention is now turned to a discussion of torated fibers, such fibers being the resultant of toration and being an important aspect of the present invention.

Torated fibers are of advantageous fineness, being comparable in this regard, as indicated in Table I above, to the best of the fibers that can be produced by the aerocor and strand prior art processes, and have a diameter generally in the range of about 0.5 to about 10 microns.

With respect to the length of torated fibers, it is pointed out that there is no theoretical limit to the length of the fiber that can be produced by toration. If the collection means utilized is selected so as to minimize the points of possible breaking of the fibers, then the collected fiber product can be composed of fibers which are extremely long. This may be more clearly understood by consideration of the path followed by the glass when being attenuated into a fiber from the glass cone. While the fiber solidifies, its critical radius of curvature, that is, the radius of curvature causing the fiber to break, increases. It is a characteristic of the invention that the fiber for at least much, if not all of its travel during toration, has a path which is approximately helicoidal, with the pitch and the amplitude increasing in the direction of flow of the fiber, and accordingly, while being cooled, the fiber is subjected to a radius of curvature which becomes greater and greater. As a result the risk of fiber breakage due to flexion is extremely small.

However, taking into account practical considerations with respect to the application of binder, the collection of fibers, the matting of fibers into wool or blanket form, fiber compaction, and fiber take-away and packaging, the maximum length of fibers is not necessary to be attained in order to produce highly advantageous products.

Torated fibers can be made from a wide variety of glasses, as above discussed, and the consequence of both the torating and of the selection of an appropriate glass can be fibers having excellent high temperature properties.

When torated fibers are assembled in the form of thermal insulation wool for building insulation, the products may have a unique low density, for exammple, from about 7 to about 25 kg/cubic meter, and such insulation products characteristically have very high thermal insulation capabilities. Further, such products made by toration are characterized by a substantially complete absence of any slugs, pellets, hooks, or other undesirable inclusions.

Further, products made by toration have an excellent thickness recovery after compaction and a very good total tensile strength. It is highly probable that these excellent qualities are due to the great length of the fibers and to the high tensile strength of the individual fibers.

Still further, products made of torated fibers have a remarkably soft and silky "feel." The "hand" and "feel" of the products made of torated fibers are outstanding, for reasons not now completely identifiable with precision, but which include the fiber's physiical characteristics set forth above.

Other reasons why the torated products have these remarkable strength properties may be the result of the rapid cooling of the fibers which is mentioned above. The very short length of Zone III, the Zone in which the fine drawing of the fibers takes place, coupled with the rapid travel of the fibers into Zone IV where they are quickly cooled, efffects a quick quenching of the fibers which, for reasons not fully understood, modifies the properties.

SPECIFIC EXAMPLES

The following examples of toration relate the experimental conditions to the results obtained from a series of runs on equipment such as is disclosed herein.

EXAMPLE I

Example I presents a series of runs conducted with equipment of the general kind discussed in FIGS. 9A, 9B and 9C and the results are given in Table III.

TABLE III

| Example No. | Blast | | | Jet | | Glass | | Orifice Pull Rate kg/hole 24 hrs. | Micronaire Reading | Arithmetic Mean Fiber Diameter in Microns |
|---|---|---|---|---|---|---|---|---|---|---|
| | Temp. °C. | Pressure cmH$_2$O | Velocity m/sec. | Pressure (bar) | Velocity m/sec. | Temp. °C. | Cone Temp. °C. | | | |
| 1 | 1580 | 45 | 224 | 2 | 580 | 800 | 1050 | 11.1 | 3.9 | — |
| 2 | 1580 | 62 | 262 | 2 | 580 | 800 | 1050 | 14.1 | 3.9 | 4.9 |
| 3 | 1580 | 72 | 283 | 2 | 580 | 800 | 1050 | 14.5 | 3.3 | 4.6 |
| 4 | 1580 | 72 | 283 | 2 | 580 | 800 | 1050 | 8.6 | 2.45 | 3.5 |
| 5 | 1580 | 72 | 283 | 2 | 580 | 800 | 1050 | 22.0 | 4.4 | 6.0 |
| 6 | 1580 | 62 | 262 | 2 | 580 | 800 | 1050 | 17.3 | 4.3 | 5.4 |

The glass composition used was as given below:

| | |
|---|---|
| SiO$_2$ | 57.00 |
| Al$_2$O$_3$ | 4.10 |
| Fe$_2$O$_3$ | .35 |
| CaO | 11.31 |
| MgO | 3.69 |
| Na$_2$O | 13.16 |
| K$_2$O | 1.54 |
| BaO | 1.60 |
| B$_2$O$_3$ | 4.55 |
| F$_2$ | 2.70 |

Torating under the operating conditions given in each of the above examples resulted in very good fiberization performance. A broad range of glass orifice pull rates extending from 8.6 to 22kg. per hole per 24 hours was recorded. A corresponding range of fiber diameters likewise was recorded. Indications of the fiber diameters are recorded in Table III in terms of the diameter, in microns, of a fiber representing the arithmetic mean value of measured fiber diameters, and also on the basis of a fiber fineness index, or a "micronaire," determination with a 5 gram sample, the latter being a standard measuring technique in the glass wool industry wherein a predetermined mass or sample of the fibers is positioned within a housing so as to form a permeable barrier to air passing through the housing under a predetermined pressure and the reading is of the air flow through the sample which is generated by the pressure drop through the sample, stated in terms empirically related to fiber diameter. In general, the finer the fibers the higher the fiber count of the sample, and the more resistance offered to the passage of air through the sample. In this manner an indication is given of the average fiber diameter of the sample. The micronaire readings and the measured diameters show a close correlation in Examples 1 through 6.

EXAMPLE II:

Example II presents a series of runs conducted with equipment of the general kind disclosed in FIG. 15D, using a glass slot, but not a multiple set-up as in FIGS. 15A and 15B. The results are given in Table IV.

TABLE IV

| | Burner | | | Jet | | Glass | | | |
|---|---|---|---|---|---|---|---|---|---|
| Example No. | Temp. °C. | Pressure cmH₂O | Velocity m/sec. | Pressure (bar) | Velocity m/sec. | Temp. °C. | Cone Temp. °C. | Orifice Pull Rate kg/hole 24 hrs. | Micronaire Reading |
| 7. | 1620 | 60 | 261 | 1.9 | 606 | 900 | 1030 | 13.8 | 4.8 |
| 8. | 1600 | 58 | 256 | 1.9 | 606 | 900 | 1010 | 6.6 | 2.4 |
| 9. | 1620 | 68 | 278 | 2 | 606 | 900 | 1030 | 15.0 | 4.1 |
| 10. | 1620 | 58 | 265 | 2 | 606 | 900 | 1000 | 9.6 | 4.0 |

The glass composition used for the runs of Example II is as follows:

| | |
|---|---|
| $SiO_2$ | 63.00% |
| $Fe_2O_3$ | 0.30 |
| $Al_2O_3$ | 2.95 |
| $CaO$ | 7.35 |
| $MgO$ | 3.10 |
| $Na_2O$ | 14.10 |
| $K_2O$ | 0.80 |
| $B_2O_3$ | 5.90 |
| $BaO$ | 2.50 |

A broad range of glass orifice pull rates resulted in a correspondingly broad range of fiber diameters. In general, it may be said that good fiberization was obtained yielding long, fine fibers at a high rate.

CROSS REFERENCE:

Attention is directed to the fact that essentially the same subject matter is disclosed in the specification and drawings of the present application and the companion application filed concurrently herewith by the present applicants and one Dominique Plantard, Ser. No. 353,984.

Although certain features, such as the use of a glass feed slot and the use of a separate blast defining plate, as included in several embodiments, illustrate the present invention in its broad aspects, such features are also disclosed and are specifically named in said companion application.

It is to be noted that omission of claims directed to any features herein disclosed is not to be understood as an abandonment of that subject matter, because such features are claimed in the above identified companion application or in other copending applications.

We claim:

1. A method of converting heat softenable material to fibers comprising the steps of generating a gaseous blast and a gaseous jet, said gaseous blast being of substantially larger cross section than said gaseous jet, said gaseous jet being of sufficient kinetic energy and positioned so as to penetrate into said gaseous blast, whereby a zone of interaction is established proximate to the path of penetration of said gaseous jet into said gaseous blast, and introducing heat softened material into said zone of interaction.

2. A method for making glass fibers from attenuable molten glass comprising establishing a gaseous blast directed in one path, and introducing the molten glass into the blast by establishing a gaseous carrier jet of smaller cross section than and penetrates the blast in a path transverse to the path of the blast and feeding a stream of the molten glass into the blast in a position, with reference to the blast, which is adjacent and downstream of the carrier jet.

3. A method of converting a softenable thermoplastic material to fibers comprising the steps of generating a main gaseous blast and a plurality of auxiliary gaseous jets, said jets being in spaced relation to one another and being positioned and penetrating into said gaseous blast and thereby establish zones of interaction each having a suction region proximate to the path of penetration of said gaseous jets into said blast, and introducing softened thermoplastic material into said zones under the influence of the suction in said regions.

4. A process for transforming an attenuable material in attenuable condition into a fiber comprising the steps of generating a gaseous blast and a gaseous jet, said gaseous jet being of smaller cross sectional area than said gaseous blast, said gaseous blast being oriented transversely to and encompassing said gaseous jet so as to establish a zone of interaction extending downstream of said gaseous jet and to provide a flow of fluid in said zone of interaction comprising two counter rotating tornadoes along opposite sides of said fluid jet, and delivering attenuable material in attenuable conditions into said zone of interaction in a region intermediate the tornadoes.

5. A process for transforming pre-softened attenuable material into a fiber, comprising the steps of generating a gaseous jet and a gaseous blast, the blast being of substantially larger cross section than said jet, the jet and blast being relatively angularly oriented so that the jet enters the blast producing a zone of interaction therein, the kinetic energy per unit volume of the jet being greater than that of the portion of the blast which flows through the operational area thereof, and introducing pre-softened attenuable material into said zone of interaction.

6. A process according to claim 5 in which the attenuable material is introduced into the peripheral region of the blast at a location upstream of the jet in a position to flow, under the influence of the blast, to the downstream side of the jet and into the zone of interaction.

7. A process according to claim 5 in which the attenuable material is introduced into the peripheral region of the blast at a location downstream of the jet in a position to flow into the zone of interaction.

8. A process for delivering pre-softened attenuable material into a principal jet, comprising the steps of establishing a secondary jet penetrating transversely into the principal jet to create a zone of interaction of the jets having a resulting current oriented transversely of the principal jet and in a direction from the boundary toward the interior of the principal jet, and using said resulting current to deliver the pre-softened attenuable material into said principal jet by delivering such material to said resulting current.

9. A method for making glass fibers from molten glass, comprising establishing a gaseous blast, establishing a gaseous jet of smaller size but higher velocity than the blast, with the jet directed to penetrate into the blast transversely thereof and thereby develop a zone of interaction between the blast and jet at the downstream side of the jet, and causing molten glass to enter said zone of interaction.

10. A method for making glass fibers from molten glass, comprising establishing a gaseous blast, delivering molten glass to a boundary of the blast, and establishing a plurality of fiberizing centers by directing a plurality of gaseous jets transversely into the blast through said boundary upstream of the delivery of molten glass to said boundary, thereby providing individual zones of interaction of each jet with the blast, the kinetic energy per unit volume of each jet being greater than that of the portion of the blast which is operational with respect to each jet.

11. A method as defined in claim 10 in which the molten glass is delivered to the boundary of the blast in a plurality of separate streams spaced from each other transversely of the blast, individual gaseous jets being directed into the blast at points upstream of the separate streams of glass.

12. A method as defined in claim 10 in which the molten glass is delivered to the boundary of the blast in a plurality of separate streams spaced from each other upstream and downstream of the blast, individual gaseous jets being directed into the blast at points upstream of the separate streams of glass.

13. A method as defined in claim 12 in which upstream and downstream jets are positioned at different angles to the blast, with a downstream jet inclined in the downstream direction of the blast, as compared with an upstream jet.

14. A method as defined in claim 12 in which upstream and downstream glass streams are offset from each transversely of the blast.

15. A method as defined in claim 10 in which molten glass is delivered to the boundary of the blast in a plurality of series of separate spaced streams, the streams of one series being spaced from each other transversely of the blast and the streams of another series being spaced from each other upstream and downstream of the blast.

16. A method for delivering attenuable molten glass from a molten glass receptacle into a gaseous blast to thereby produce glass fibers, which method comprises establishing a gaseous blast directed in a path having a boundary adjacent a wall of the receptacle, delivering a stream of molten glass through said wall of the receptacle into said path, and establishing a gaseous jet transverse to said path and penetrating the gaseous blast in a position, with relation to the blast, which is adjacent and upstream of the stream of molten glass.

17. A process for transforming attenuable material into a fiber, characterized by the steps of generating a high speed gaseous blast and a higher speed gaseous jet, the jet being of smaller cross section and relatively angularly oriented so that it enters the blast thereby producing a zone of interaction between the blast and jet, and introducing said material in attenuable condition into said zone of interaction, whereby said attenuable material is progressively attenuated into the form of a fiber entrained in the gaseous flow which results from the combination of the blast and the jet.

18. A method for making glass fibers comprising delivering molten glass from a discharge orifice, establishing a gaseous blast directed in a path with a boundary of the blast adjacent the glass discharge orifice, and establishing a gaseous jet directed in a path transverse to the path of the blast and penetrating the blast at a location upstream of the glass orifice, the jet being of width smaller than the width of the blast.

19. A method for making glass fibers from molten glass, comprising establishing a gaseous blast, establishing a plurality of gaseous jets with the jets directed to penetrate into the blast transversely thereof and thereby develop zones of interaction between the blast and jets at the downstream sides of the jets, the jets being spaced from each other transversely of the blast by a distance at least equal to about 2 to 3 times the jet diameter.

20. A method for making glass fibers from molten glass, comprising establishing a gaseous blast, establishing a plurality of fiberizing centers by directing a plurality of gaseous jets penetrating into the blast transversely thereof and thereby developing zones of interaction between the blast and jets at the downstream sides of the jets, and delivering molten glass to said zones, the jets being spaced from each other upstream and downstream of the blast.

21. A method according to claim 20 in which said jets are aligned with each other upstream and downstream of the blast.

22. A method according to claim 21 in which the center to center spacing of consecutive upstream and downstream fiberizing centers is at least equal to 7 to 10 times the jet diameter.

23. A method according to claim 20 in which successive fiberizing centers are laterally offset from each other by at least about 1 to 2 times the jet diameter and in which said fiberizing centers are spaced from each other upstream and downstream by a distance about 4 or 5 times the jet diameter.

24. A process for delivering pre-softened attenuable material into a principal jet, comprising establishing a secondary jet of smaller cross section than that of the principal jet, the secondary jet being directed transversely of an penetrating into the principal jet to create a zone of interaction of the jets having a resulting current transverse to the principal jet, and using said resulting current to deliver the pre-softened material into said principal jet.

25. A method of converting attenuable material, particularly molten glass, to fibers, characterized in that is comprises the steps of generating a principal jet, more particularly a gaseous blast, feeding attenuable material to a plurality of boundaries of the blast, and delivering the attenuable material from said boundaries into the blast and attenuating the material to form fibers by establishing secondary jets of smaller diameter than the blast penetrating transversely into the blast through each of said boundaries, the kinetic energy of each secondary jet per unit of volume being greater than the kinetic energy of the blast in the operational area thereof to create a zone of interaction of each secondary jet and the blast having a resulting current oriented transversely of and in a direction from the boundary toward the interior of the blast, thereby using said resulting current to carry the attenuable material into the interior of the blast from each of said boundaries and to effect attenuation in each of said zones of interaction.

26. Equipment for making glass fibers comprising supply means for molten glass having discharge orifices, means for extablishing a gaseous blast directed in a path adjacent the glass discharge orifices, wall elements at least in part defining opposed boundaries of the blast, and means for establishing gaseous jets directed in paths transverse to the path of the blast and in positions to penetrate the blast at locations upstream of each glass orifice, each jet being of smaller width than the width of the blast, the equipment having molten glass and jet orifices opening through each of said opposed blast defining wall elements.

27. Equipment as defined in claim 25, in which the jet and glass orifices through one wall element are offset, longitudinally of the blast, with respect to the jet and glass orifices through the other wall element.

28. A process as defined in claim 24 in which the said secondary jet has a kinetic energy per unit of volume higher than that of the portion of said principal jet which flows through the operational area thereof, the ratio of secondary jet kinetic energy per unit of volume to the principal jet kinetic energy per unit of volume being within the range from slightly greater than unity up to about 40 to 1.

29. A process as defined in claim 28 in which the ratio is between 4 to 1 and 25 to 1.

30. A method of manufacturing a fiber from attenuable material including the steps of generating a gaseous blast, generating a gaseous jet oriented so as to penetrate transversely into said gaseous blast, said gaseous blast being of substantially larger cross section than said gaseous jet whereby a zone of interaction is established along the path of said penetrating jet, said zone of interaction being characterized by two counter-rotating whirls emerging from opposite sides of said penetrating jet and characterized by a negative pressure region on the downstream side of said jet, and continuously introducing attenuable material into said zone, by delivering the material to said zone in attenuable condition, whereby said attenuable material continuously flows into said region of negative pressure where it is held in relatively stable position and in conical shape while being continuously drawn into a fiber by the action of said counter-rotating whirls.

31. Apparatus for making glass fibers from attenuable molten glass comprising means for establishing a gaseous blast, structure at a side of the blast defining a boundary thereof, means for delivering a gaseous carrier jet transversely into the blast through said boundary thereof, and means for delivering a stream of molten glass through said structure and to said boundary of the blast in a position, with relation to the blast, which is adjacent and downstream of the carrier jet.

32. Apparatus as defined in claim 31 in which the means for delivering the carrier jet into the blast comprises a jet pipe having a discharge orifice substantially at said boundary of the blast.

33. Equipment for making glass fibers comprising means for establishing a gaseous blast, means for establishing a gaseous jet of smaller size than the blast, with the jet directed transversely of and penetrating into the blast and thereby develop a zone of interaction between the blast and jet at the downstream side of the jet, the kinetic energy of the jet per unit of volume being greater than that of the portion of the blast which flows through the operational area thereof, and supply means for effecting delivery of molten glass so that it will enter said zone of interaction.

34. A method as defined in claim 1 in which the gaseous jet is of higher velocity than the blast.

35. A method as defined in claim 1 in which the ratio of jet kinetic energy per unit of volume to blast kinetic energy per unit of volume is within the range from slightly greater than unity up to about 40 to 1.

36. A method as defined in claim 35 in which the ratio is between 4 to 1 and 25 to 1.

37. Equipment as defined in claim 33 in which the glass supply means comprises a supply orifice positioned to deliver glass adjacent to the jet in the region of the boundary of the blast.

38. Equipment as defined in claim 33 in which the glass supply means comprises a supply orifice positioned to deliver glass in the region of the boundary of the blast adjacent the downstream side of the jet.

39. Equipment as defined in claim 33 in which the glass supply means comprises means for introducing glass into the blast upstream of the jet in position to be carried by the blast to the downstream side of the jet and thus into said zone of interaction.

40. Equipment for making glass fibers comprising means for establishing a gaseous blast, a plurality of fiberizing centers associated with said blast including means for supplying molten glass to the region of the boundary of the blast and each fiberizing center further including means for directing a gaseous jet of smaller cross section than that of the blast into the blast transversely thereof upstream of the glass supply means.

41. Equipment as defined in claim 40 in which the jets are spaced from each other transversely of the blast.

42. Equipment as defined in claim 41 in which the glass supply means comprises a separate glass supply orifice for each fiberizing center.

43. Equipment for making glass fibers comprising means for establishing a gaseous blast, a plurality of fiberizing centers associated with said blast including means for supplying molten glass to the region of the boundary of the blast and each fiberizing center including means for directing a gaseous jet of smaller cross section than that of the blast into the blast transversely thereof upstream of the glass supply means, the equipment including such fiberizing centers spaced upstream and downstream from each other along the blast.

44. Equipment as defined in claim 43 in which upstream and downstream jets are positioned at different angles to the blast, with a downstream jet inclined in the downstream direction of the blast, as compared with an upstream jet.

45. A method as defined in claim 21 in which the kinetic energy of the jet of an upstream fiberizing center is greater than that of a jet of a downstream fiberizing center.

46. A method as defined in claim 45 in which the jet of an upstream fiberizing center is of higher velocity than the jet of a downstream center.

47. Equipment as defined in claim 43 in which adjacent upstream and downstream centers are offset from each other transversely of the blast.

48. Equipment as defined in claim 43 in which said jets are aligned with each other upstream and downstream of the blast.

49. Equipment as defined in claim 48 in which the center to center spacing of adjacent upstream and downstream jets is at least 7 to 10 times the jet diameter.

50. Equipment as defined in claim 43 in which successive jets are laterally offset from each other and in which said jets are spaced from each other upstream and downstream by a center to center distance about 4 or 5 times the jet diameter.

51. A method for making glass fibers from molten glass, comprising establishing a gaseous blast, establishing a plurality of gaseous jets of smaller cross section than the blast and with the jets directed to penetrate into the blast transversely thereof and thereby develop zones of interaction between the blast and jets at the downstream sides of the jets, the jets being spaced from each other upstream and downstream of the blast, and delivering molten glass to the blast in regions downstream of the jets, the kinetic energy of an upstream jet being greater than that of a downstream jet.

52. A method as defined in claim 51 in which an upstream jet has a higher velocity than a downstream jet.

53. Equipment for making glass fibers comprising means for establishing a gaseous blast, a plurality of fiberizing centers associated with said blast including means for supplying molten glass to the region of the boundary of the blast and each fiberizing center including means for directing a gaseous jet into the blast transversely thereof upstream of the glass supply means, each jet being of smaller cross section than that of the blast, the equipment including such fiberizing centers spaced from each other both transversely of and upstream and downstream of the blast.

54. Equipment as defined in claim 53 in which adjacent upstream and downstream fiberizing centers are offset from each other transversely of the blast.

55. Equipment for making glass fibers comprising supply means for molten glass having a discharge orifice, means for establishing a gaseous blast directed in a path with a boundary of the blast adjacent the glass discharge orifice, and means for establishing a gaseous jet directed in a path transverse to the path of the blast and in a position to penetrate the blast at a location upstream of the glass orifice, the jet being of smaller width than the width of the blast.

56. Equipment as defined in claim 55 in which the means for establishing the gaseous jet has a jet discharge orifice adjacent to the boundary of the blast.

57. Equipment as defined in claim 55 and further including wall elements at least in part defining at least a plurality of the boundaries of the blast.

58. Equipment as defined in claim 57 and further including molten glass and jet orifices opening through a plurality of the blast defining wall elements.

59. Equipment for making glass fibers comprising means for establishing a gaseous blast, means for supplying molten glass to the blast having orifice means for delivering molten glass in an elongated zone transverse to the blast, the orifice means being positioned so that the plane of emission of the glass lies adjacent a boundary of the blast, and means for establishing a plurality of gaseous jets of small cross section as compared with the blast, with the jets directed into the blast through said boundary in an elongated zone upstream of the orifice means.

60. Equipment as defined in claim 59 in which the glass orifice means comprises a plurality of separate orifices spaced from each other, with an orifice positioned adjacent the blast downstream of the respective jets.

61. Equipment as defined in claim 59 in which the means for establishing the jets includes jet orifices disposed in a plane adjacent said boundary of the blast.

62. Equipment for making fibers from attenuable material comprising means for establishing a fluid blast, means for establishing a fluid jet of smaller size but higher velocity than the blast, with the jet directed to penetrate into the blast transversely thereof and thereby develop a zone of interaction between the blast and jet at the downstream side of the jet, and supply means for causing the attenuable material to enter said zone of interaction.

63. Apparatus for making glass fibers from attenuable molten glass comprising means for establishing a gaseous blast directed in one path, and means for introducing molten glass into the blast including means for establishing a gaseous carrier jet of smaller cross section than the blast and directed in a path transverse to the path of the blast in position to penetrate the boundary of and enter the blast and including means for feeding a stream of the molten glass into the blast in a position, with reference to the blast, which is adjacent and downstream of the carrier jet.

64. Equipment for making glass fibers comprising means for establishing a gaseous blast, a plurality of fiberizing centers associated with said blast including means for supplying molten glass to the region of the boundary of the blast and each fiberizing center including means for directing a gaseous jet of smaller cross section than that of the blast into the blast transversely thereof spaced upstream of the glass supply means by a center to center distance not greater than about 2 jet diameters.

65. Equipment for making glass fibers comprising means for establishing a gaseous blast, a plurality of fiberizing centers associated with said blast including means for supplying molten glass to the region of the boundary of the blast and each fiberizing center including means for directing a gaseous jet of smaller cross section than that of the blast into the blast transversely thereof upstream of the glass supply means, the equipment including such fiberizing centers spaced from each other transversely of the blast by a center to center distance at least 2 to 3 times the jet diameter.

66. Apparatus for making a fiber from attenuable material, characterized in that it comprises means for establishing a gaseous blast, means for establishing a gaseous jet having a cross section smaller than that of the blast, with the jet directed to penetrate into the blast transversely thereof, and means for introducing a stream of attenuable material in the region where the jet enters the blast.

67. Apparatus according to claim 66 in which the means for introducing attenuable material comprises means for introducing same at a location immediately downstream of the jet, with respect to the direction of the blast.

68. Glass fibers made from molten glass by the method of claim 1.

* * * * *